US008810809B2

(12) United States Patent
Yamada

(10) Patent No.: US 8,810,809 B2
(45) Date of Patent: Aug. 19, 2014

(54) CHARACTER OUTPUT APPARATUS, CHARACTER OUTPUT METHOD AND COMPUTER READABLE MEDIUM

(75) Inventor: Masao Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1023 days.

(21) Appl. No.: 12/542,271

(22) Filed: Aug. 17, 2009

(65) Prior Publication Data

US 2010/0238472 A1   Sep. 23, 2010

(30) Foreign Application Priority Data

Mar. 19, 2009   (JP) .................... 2009-067503

(51) Int. Cl.
*G06K 15/02* (2006.01)
*G06F 15/00* (2006.01)

(52) U.S. Cl.
USPC ........................................ 358/1.11; 358/1.1

(58) Field of Classification Search
None
See application file for complete search history.

(56) References Cited

U.S. PATENT DOCUMENTS

| | | | |
|---|---|---|---|
| 5,208,904 A | | 5/1993 | Sasaki |
| 5,562,350 A | * | 10/1996 | Sakurai ............................ 400/61 |
| 6,329,993 B1 | | 12/2001 | Yamada |
| 6,816,268 B1 | * | 11/2004 | Suzuki ......................... 358/1.11 |

FOREIGN PATENT DOCUMENTS

| | | |
|---|---|---|
| JP | A-60-24584 | 2/1985 |
| JP | A-2-232775 | 9/1990 |
| JP | A-5-96787 | 4/1993 |
| JP | A-11-202849 | 7/1999 |
| JP | A-11-328398 | 11/1999 |

OTHER PUBLICATIONS

Japanese Office Action dated Jan. 18, 2011 in Japanese Patent Application No. 2009-067503 (with translation).

* cited by examiner

*Primary Examiner* — Marcus T Riley
(74) *Attorney, Agent, or Firm* — Oliff PLC

(57) ABSTRACT

A character output apparatus includes an intermediate character information generating section, an intermediate character information modification section and a character output section. The intermediate character information generating section generates intermediate character information indicating a certain character. The intermediate character information is formed by element information pieces. And each element information piece has a start point and an end point in an X-axis direction in a two-dimensional coordinate system for characters. The intermediate character information modification section performs modification processing for changing a thickness of the certain character onto each element information piece of the generated intermediate character information, by changing the start point and the end point of each element information piece in accordance with a modification amount. The character output section outputs the certain character based on the changed start point and the changed end point of each element information piece.

10 Claims, 21 Drawing Sheets

<FIRST EXEMPLARY EMBODIMENT>

Bx: MODIFICATION AMOUNT IN X-AXIS DIRECTION
Em_X: TOTAL NUMBER OF ELEMENTS IN m-th LINE
M-1: MAXIMUM IN Y-AXIS DIRECTION OF DRAWING AREA OF CHARACTER

<FIRST EXEMPLARY EMBODIMENT>

(1) CHARACTER BEFORE BOLD MODIFICATION IN X-AXIS DIRECTION (2) INTERMEDIATE CHARACTER PATTERN TP

| | START POINT | END POINT |
|---|---|---|
| 4 | 5 | 5 |
| 3 | 3 | 5 |
| 2 | 1 | 3 |
| 1 | 2 | 2 |

<FIRST EXEMPLARY EMBODIMENT>

(1) CHARACTER AFTER BOLD MODIFICATION IN X-AXIS DIRECTION

MODIFICATION AMOUNT IN X-AXIS DIRECTION
$Bx\_L = 1$
$Bx\_R = 1$ (2) INTERMEDIATE CHARACTER PATTERN TP_X

| | START POINT | | END POINT |
|---|---|---|---|
| 4 | 4 | | 6 |
| 3 | 2 | | 6 |
| 2 | 0 | | 4 |
| 1 | 1 | | 3 |

○ OUTPUT PIXELS BEFORE BOLD PROCESSING IN X-AXIS DIRECTION

<FIRST EXEMPLARY EMBODIMENT>

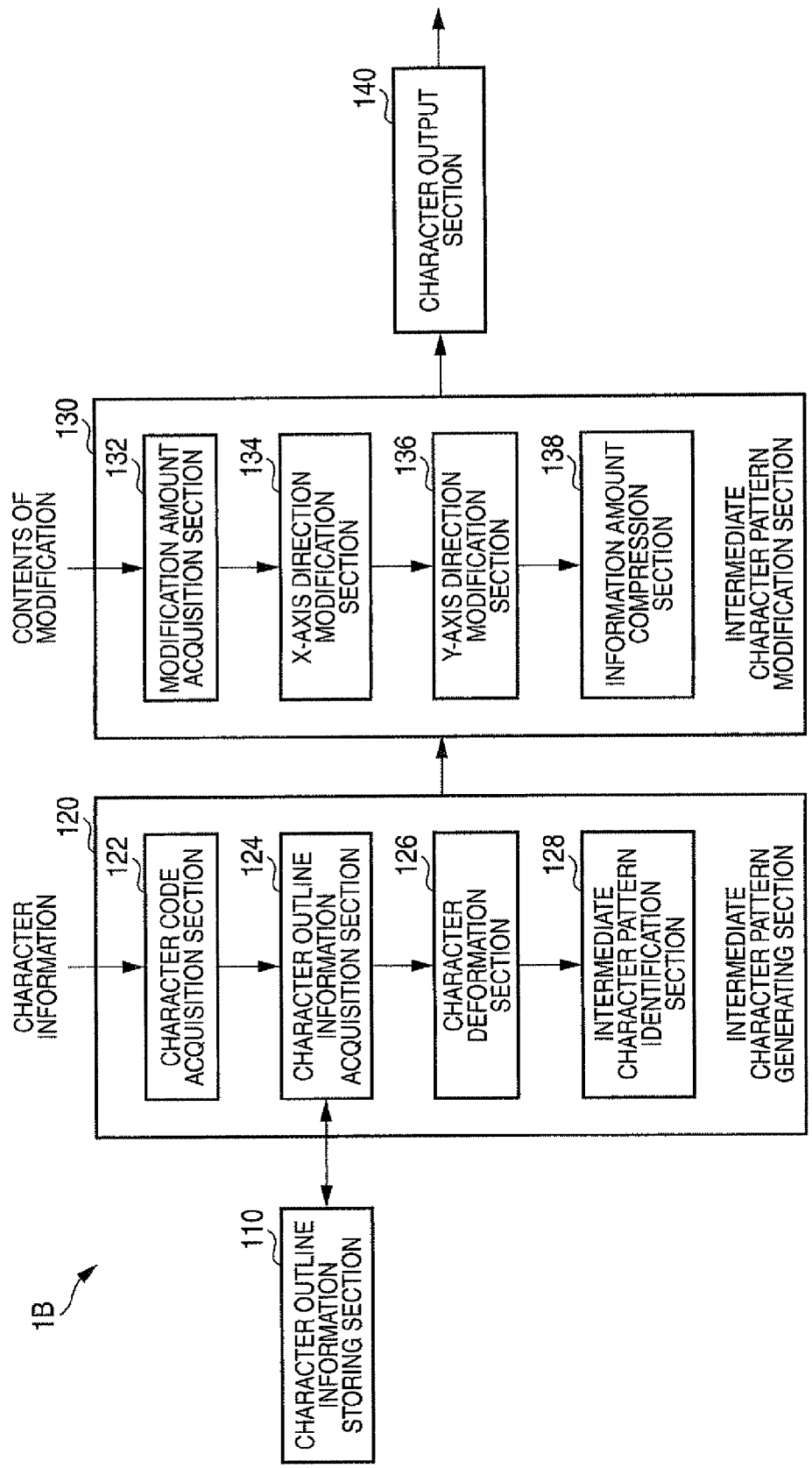

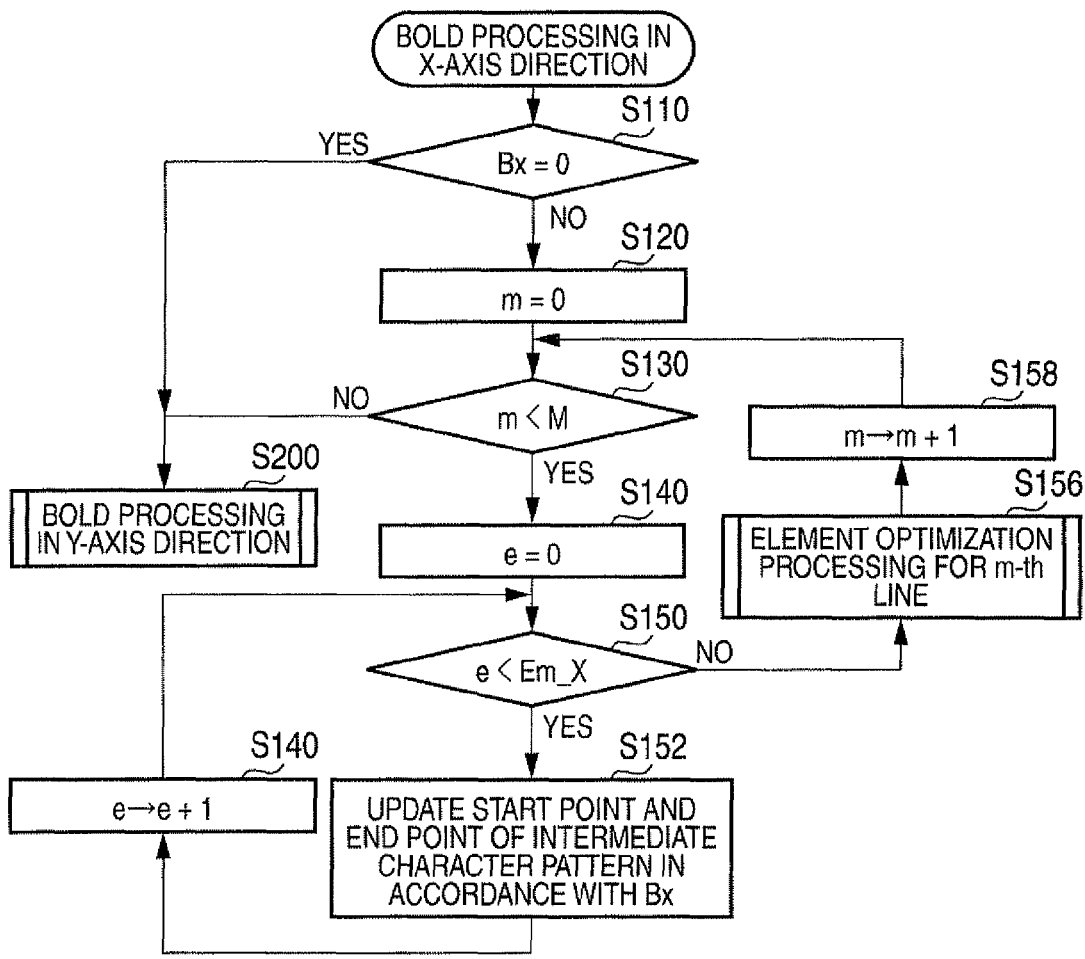

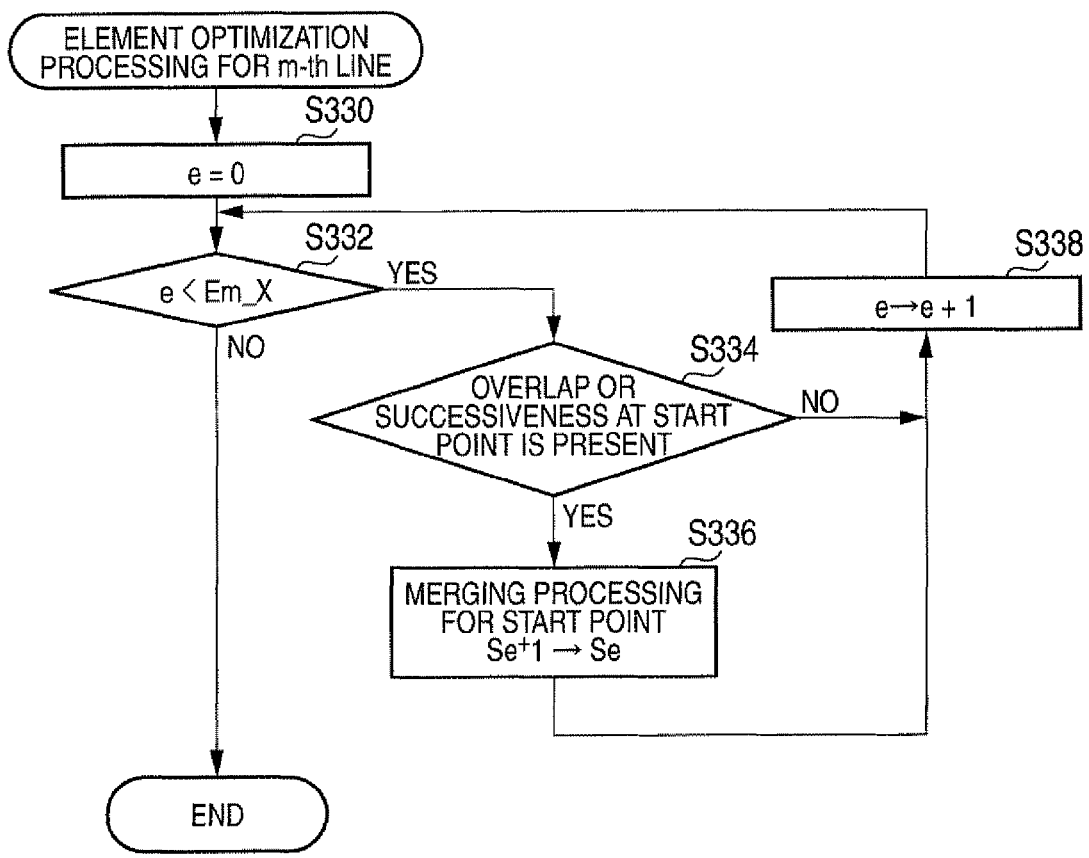

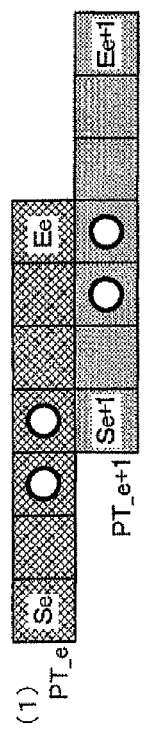
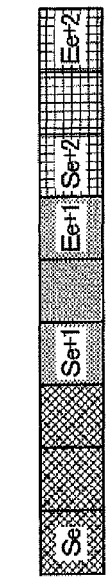
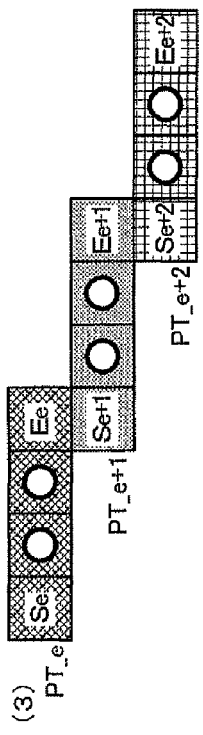
FIG. 7C (1) INTERMEDIATE CHARACTER PATTERN TP_Y
(BEFORE SORTING PROCESSING)

(2) INTERMEDIATE CHARACTER PATTERN TP_Y
(COURSE OF TRANSITION IN SORTING PROCESSING FOR SECOND LINE)

(3) INTERMEDIATE CHARACTER PATTERN TP_Y
(AFTER SORTING PROCESSING)

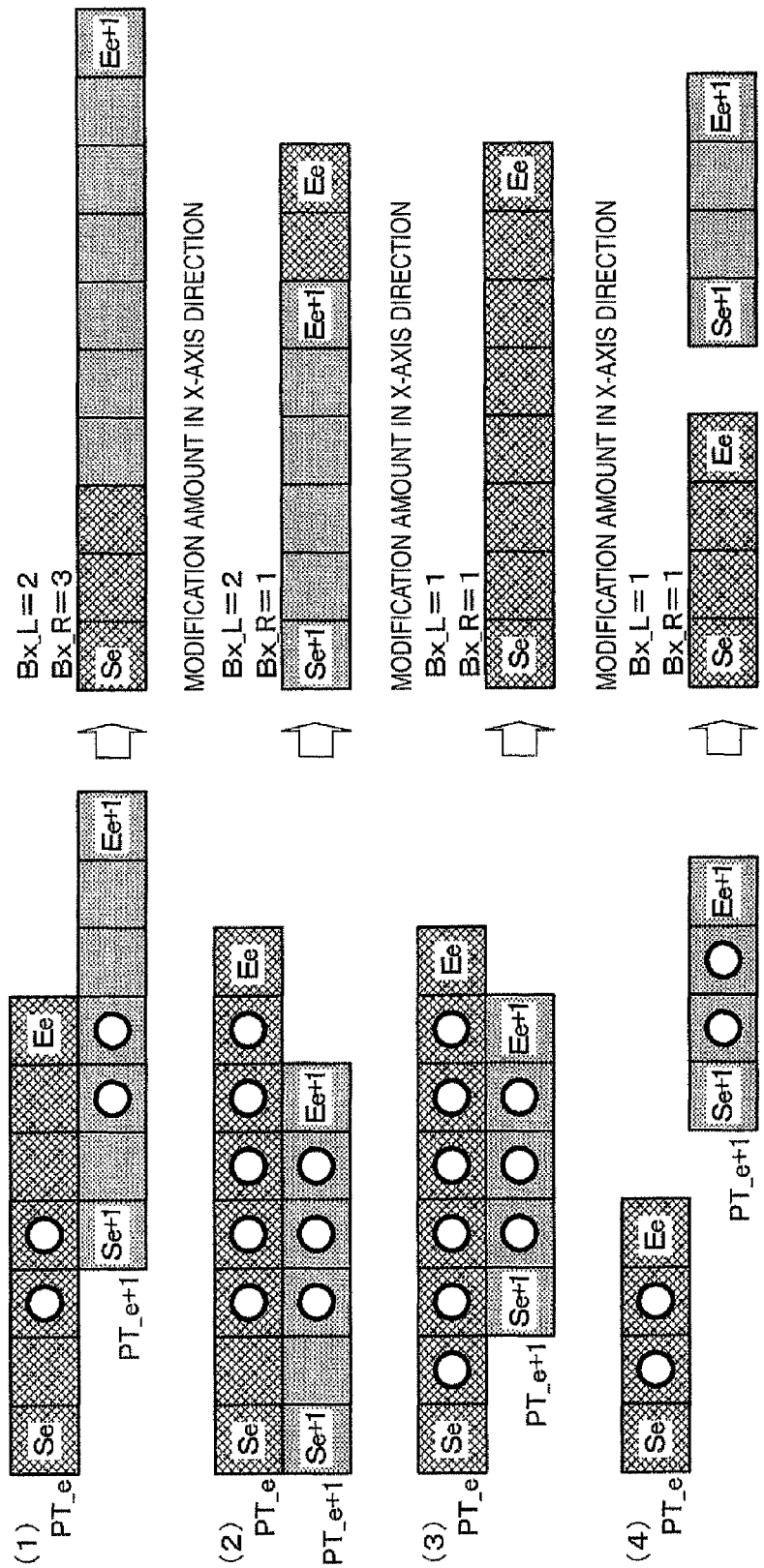

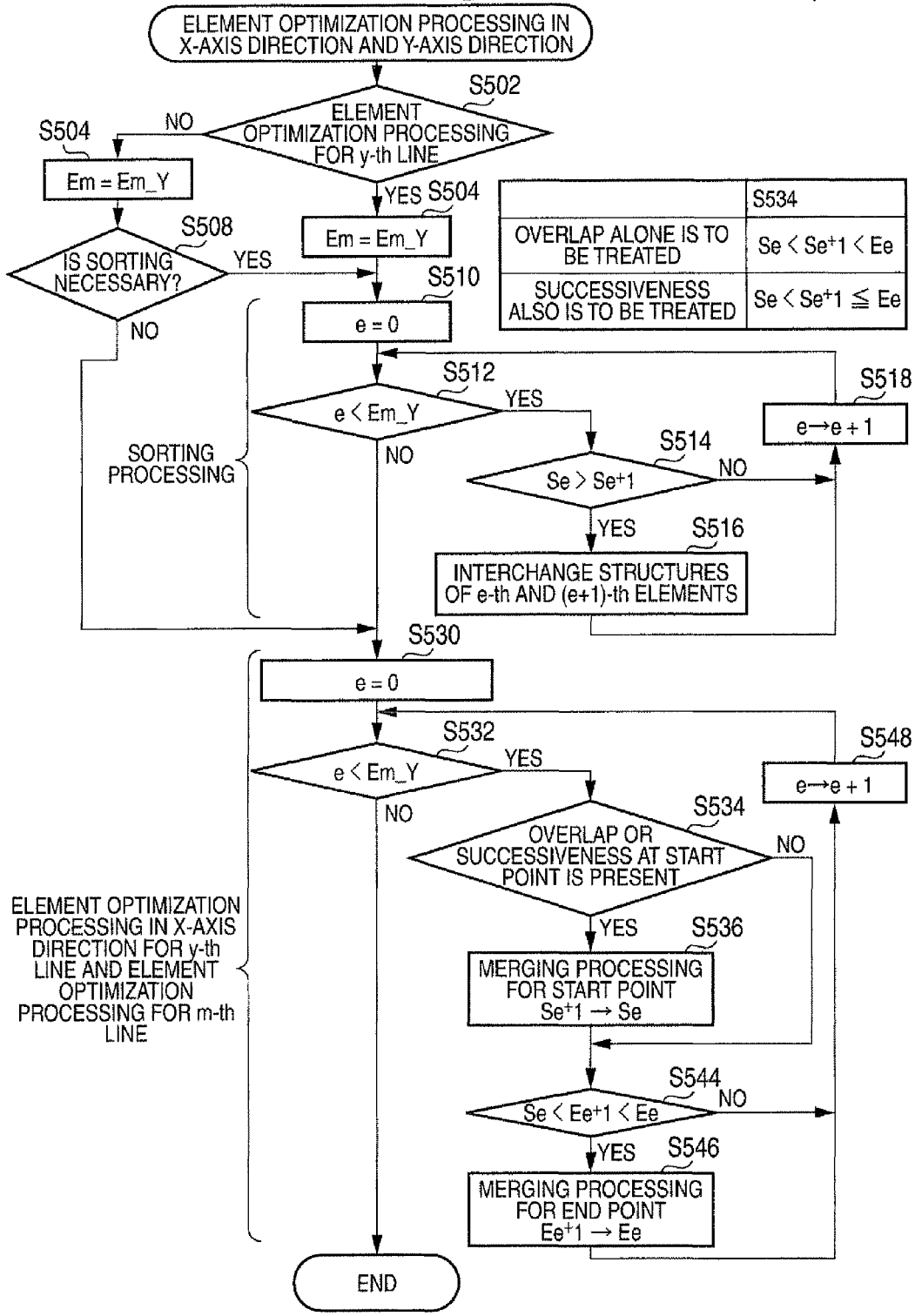

<THIRD EXEMPLARY EMBODIMENT: FIRST EXAMPLE>

<THIRD EXEMPLARY EMBODIMENT: SECOND EXAMPLE>

CHARACTER OUTPUT APPARATUS, CHARACTER OUTPUT METHOD AND COMPUTER READABLE MEDIUM

CROSS-REFERENCE TO RELATED APPLICATIONS

This application is based on and claims priority under 35 USC 119 from Japanese Patent Application No. 2009-067503 filed on Mar. 19, 2009.

BACKGROUND

1. Technical Field

The present invention relates to a character output apparatus, a character output method and a computer readable medium.

2. Related Art

A mechanism is proposed that permits outputting of thick characters (also referred to as bold characters) or thin characters even when fonts of thick typeface (boldface) or thin typeface are not provided. Here, the processing (bold modification) of modifying a character into thick one is referred to as character thickening processing or bold processing.

SUMMARY

According to an aspect of the invention, a character output apparatus includes an intermediate character information generating section, an intermediate character information modification section and a character output section. The intermediate character information generating section generates intermediate character information indicating a certain character. The intermediate character information is formed by element information pieces, and each element information piece has a start point and an end point in an X-axis direction in a two-dimensional coordinate system for characters. The intermediate character information modification section performs modification processing for changing a thickness of the certain character onto each element information piece of the generated intermediate character information, by changing the start point and the end point of each element information piece in accordance with a modification amount. The character output section outputs the certain character based on the changed start point and the changed end point of each element information piece.

BRIEF DESCRIPTION OF THE DRAWINGS

Exemplary embodiment (s) of the present invention will be described in detail based on the following figures, wherein:

FIG. 6 is a diagram showing a configuration of a character output apparatus according to a second exemplary embodiment;

FIG. 7A is a flowchart describing bold processing in the X-axis direction according to a second exemplary embodiment;

FIG. 7B is a flow chart describing the operation of information amount compression processing in the X-axis direction;

FIG. 7C is a diagram showing an example of a character formed before and after information amount compression processing in the X-axis direction and its intermediate character pattern;

FIG. 8D is a diagram showing an example of a character formed before and after information amount compression processing in the X-axis direction in information amount compression processing in the Y-axis direction and its intermediate character pattern according to a second exemplary embodiment;

FIG. 8F is a flow chart describing the operation of information amount compression processing in the X-axis direction and the Y-axis direction according to a second exemplary embodiment;

DETAILED DESCRIPTION

Exemplary embodiments of the present invention are described below in detail with reference to the drawings.

First Exemplary Embodiment

[Apparatus Configuration]

Figure 1:
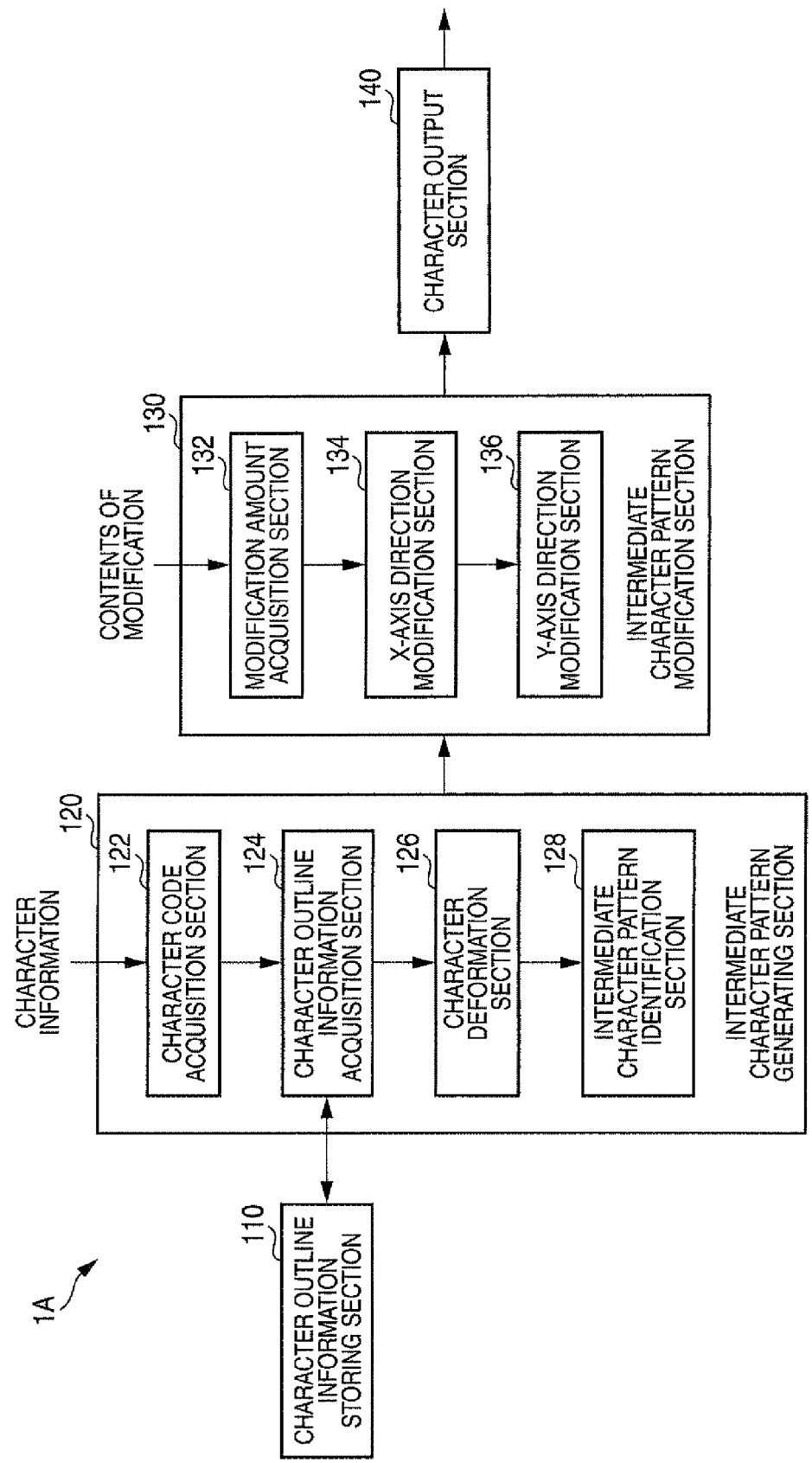
FIG. 1 is a diagram showing a configuration of a character output apparatus according to a first exemplary embodiment.

FIG. 1 is a diagram showing a configuration of a character output apparatus according to a first exemplary embodiment. The character output apparatus may be an image forming apparatus (a so-called printing apparatus) of a mode of printing out characters onto a printing medium such as a paper sheet and an OHP (Over Head Projector) sheet, or alternatively may be a display apparatus of a mode of displaying characters on a display medium such as a liquid crystal panel and a CRT (cathode-ray tube).

The character output apparatus 1A according to the first exemplary embodiment has a character outline information storing section 110, an intermediate character pattern generating section 120, an intermediate character pattern modification section 130, and a character output section 140. The intermediate character pattern generating section 120, the intermediate character pattern modification section 130, and the character output section 140 constitutes an intermediate character pattern processing section 3.

In the character outline information storing section 110, character outline information to be used by the character processing system is stored in a storage medium.

An intermediate character pattern is an example of the intermediate character information obtained by expressing a character on the basis of a two-dimensional coordinate system, and merging element information pieces (referred to as elements) that set forth the start point and the end point in the X-axis direction of each element constituting a character. The intermediate character pattern generating section 120 is an example of the intermediate character information generating section for generating an intermediate character pattern.

When a bold character is to be generated in a case that a bold typeface is not provided, on the basis of the character outline information stored in the character outline information storing section 110, the intermediate character pattern generating section 120 generates an intermediate character pattern which is a character pattern of intermediate form suitable for bold processing. For this purpose, the intermediate character pattern generating section 120 has a character code acquisition section 122, a character outline information acquisition section 124, a character deformation section 126, and an intermediate character pattern identification section 128.

The character code acquisition section 122 acquires a character code in a document, and then transfers the data to the character outline information acquisition section 124. From the character outline information storing section 110, the character outline information acquisition section 124 acquires character outline information corresponding to the character code transferred from the character code acquisition section 122, and then transfers the data to the character deformation section 126. The character deformation section 126 performs magnification change (expansion or reduction) and deformation (such as change into italic) specified for the character outline information, and then transfers the deformed character outline information to the intermediate character pattern identification section 128. For the deformed character outline information, the intermediate character pattern identification section 128 generates an intermediate character pattern TP suitable for bold processing in accordance with a rule described later, and then transfers the data to the intermediate character pattern modification section 130.

The intermediate character pattern modification section 130 is an example of the intermediate character information modification section for performing modification processing of changing the thickness of a character onto the intermediate character pattern generated in the intermediate character pattern generating section 120. The intermediate character pattern modification section 130 according to the first exemplary embodiment performs bold processing in a specified modification direction by a specified modification amount onto the intermediate character pattern generated in the intermediate character pattern generating section 120, so as to generate a bold-modified intermediate character pattern, and then transfers the data to the character output section 140. For this purpose, the intermediate character pattern modification section 130 has a modification amount acquisition section 132, an X-axis direction modification section 134, and a Y-axis direction modification section 136.

The modification amount acquisition section 132 receives information concerning the modification amount OR of bold processing from a control section (not shown). The modification amount acquisition section 132 acquires the modification amount OR in each of the X-axis direction and the Y-axis direction of character coordinates, that is, information concerning the number of pixels by which the character is to be thickened. Then, the modification amount acquisition section 132 notifies the modification amount Bx in the X-axis direction to the X-axis direction modification section 134, and notifies the modification amount By in the Y-axis direction to the Y-axis direction modification section 136.

On the basis of the modification amount Bx in the X-axis direction notified from the modification amount acquisition section 132, the X-axis direction modification section 134 performs bold processing in the X-axis direction onto the intermediate character pattern TP received from the intermediate character pattern generating section 120, and then transfers the processed intermediate character pattern TP_X to the Y-axis direction modification section 136.

Here, the bold modification in the X-axis direction may be achieved by bold processing performed in both of the right and left directions of the character or alternatively by bold processing performed only in one of the right and left directions of the character. In setting of the modification amount Bx (defined as a positive value) in the X-axis direction, both of the modification amount Bx_L in the left direction for the character and the modification amount Bx_R in the right direction for the character are set up individually. When the bold modification amount is zero, this indicates that bold processing is unnecessary.

On the basis of the modification amount By in the Y-axis direction notified from the modification amount acquisition section 132, the Y-axis direction modification section 136 performs bold processing in the Y-axis direction onto the intermediate character pattern TP_X received from the X-axis direction modification section 134, and then transfers the processed intermediate character pattern TP_Y to the character output section 140.

Here, the bold modification in the Y-axis direction may be achieved by bold processing performed in both of the up and down directions of the character or alternatively by bold processing performed only in one of the up and down directions of the character. In setting of the modification amount By (defined as a positive value) in the Y-axis direction, both of the modification amount By_U in the up direction for the character and the modification amount By_D in the down direction for the character are set up individually. When the bold modification amount is zero, this indicates that bold processing is unnecessary.

The character output section 140 receives information concerning the presence or absence of bold processing from a control section (not shown). The character output section 140 outputs a character on the basis of the intermediate character pattern TP generated in the intermediate character pattern generating section 120 or alternatively the bold-processed intermediate character pattern TP_Y generated in the intermediate character pattern modification section 130. Specifically, in the case of absence of bold processing, the character output section 140 refers to the intermediate character pattern TP from the intermediate character pattern generating section 120. In the case of presence of bold processing, the character output section 140 refers to the intermediate character pattern TP_Y from the intermediate character pattern modification section 130.

[Intermediate Character Pattern]

Figure 2:
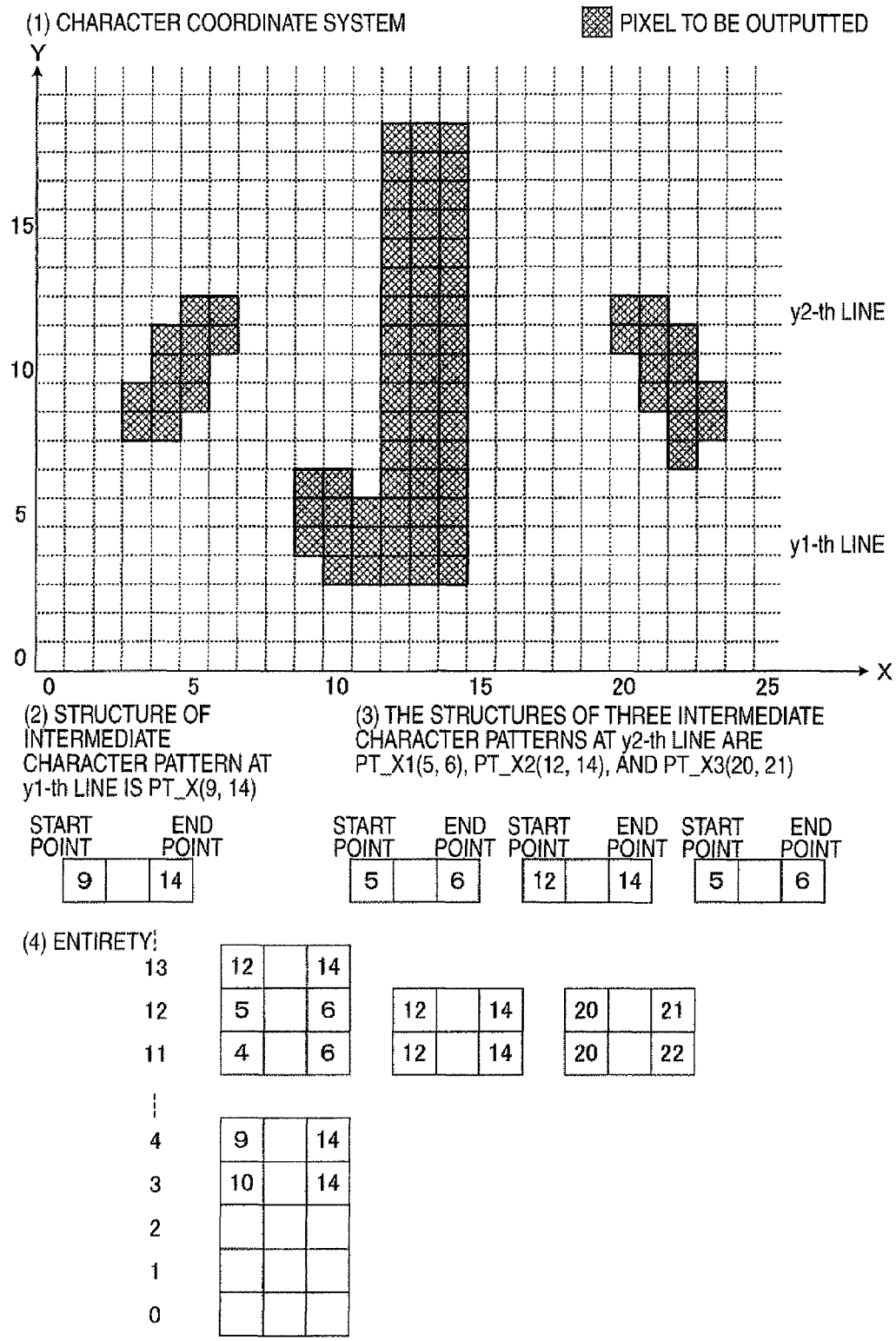
FIG. 2 is a diagram describing an intermediate character pattern.

FIG. 2 is a diagram describing an intermediate character pattern generated by the intermediate character pattern generating section 120.

The two-dimensional coordinate system used when a character is expressed by a bitmapped character pattern is referred to as a character coordinate system. The assignment of the X-axis direction and the Y-axis direction shown in FIG. 2 is an example. That is, the X-axis direction and the Y-axis direction may be interchanged. In the bitmapped character pattern (bitmapped character), a character is expressed as a set of points (pixels or dots) of small square. Then, the shape of each character is expressed by a fixed number of pixels (vertical M×horizontal N; N=M is employable). The intermediate character pattern is obtained by merging elements in the X-axis direction, as well as those in the Y-axis direction, that have information concerning the drawing start position (start point) and the drawing end position (end point) in the character coordinate system in a case that a character is expressed in the form of a bit map. In the following description of the present specification, the structure of each element in the X-axis direction of an intermediate character pattern is expressed as PT (start point, end point).

When the character output section 140 outputs a character on the basis of the intermediate character pattern TP_Y, it is sufficient that processing is performed such that on the basis of PT (start point, end point) that expresses the structure of each element constituting the intermediate character pattern TP_Y, the range from the start point to the end point in the X-axis direction is adopted as pixels of output target.

In FIG. 2 part (1), a Japanese character is exemplary shown in the form of a bit map. In the figure, shaded pixels are those to be outputted (printed), while non-shaded pixels are those not to be outputted (printed).

Each element in the X-axis direction has the information concerning the start point in the X-axis direction and the end point in the X-axis direction for drawing. For example, FIG. 2 part (2) shows an example that character components in a particular row in the character coordinate system constitute a single group (element) in the X-axis direction. For example, this corresponds to a case that attention is focused on the y1-th line in the figure of the Japanese character. In the example of the figure, the ninth pixel to the 14th pixel in the X-axis direction are to be printed. Thus, the structure of the intermediate character pattern at the y1-th line is PT_X(9,14).

FIG. 2 part (3) shows an example that character components in a particular row in the character coordinate system constitute a plurality of groups (elements) in the X-axis direction. For example, this corresponds to a case that attention is focused on the y2-th line in the figure of the Japanese character. In the example of the figure, three elements are present in the X-axis direction. That is, the fifth pixel to the sixth pixel are to be printed, the twelfth pixel to the 14th pixel are to be printed, and the 20th pixel to the 21st pixel is to be printed. The structures of the intermediate character patterns at the y2-th line are PT_X1(5,6), PT_X2(12,14), and PT_X3(20, 21), respectively.

FIG. 2 part (4) shows the structure of the overall intermediate character pattern obtained by merging also for the Y-axis direction the elements in the X-axis direction at each line (row). Each line having no description of position information concerning the start point and the end point indicates a line having no pixel of printout target.

[X-Axis Direction Processing]

Figure 3:
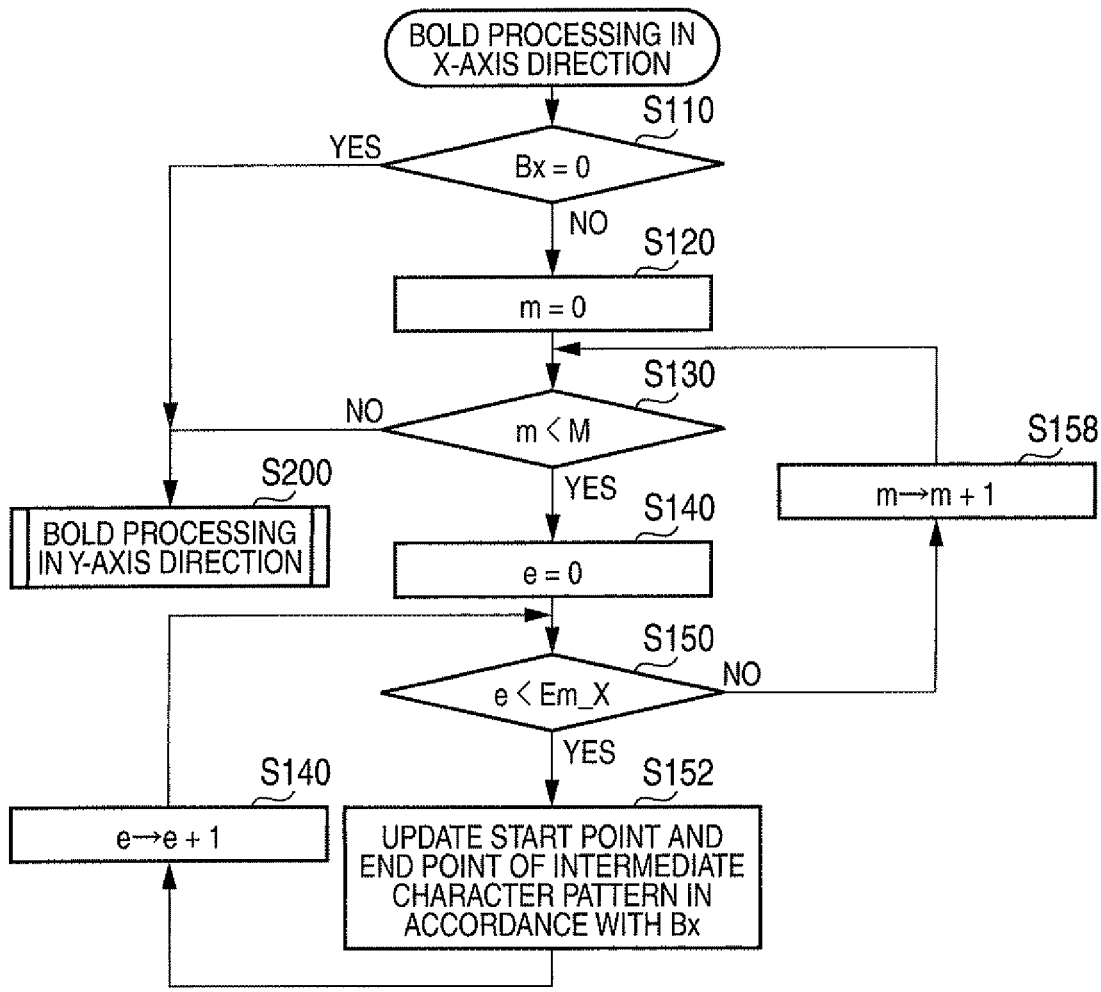
FIG. 3 is a flow chart describing bold processing in the X-axis direction according to a first exemplary embodiment.

FIG. 3 is a flow chart describing the bold processing in the X-axis direction (especially, the operation of the X-axis direction modification section 134) performed in the intermediate character pattern modification section 130 according to the first exemplary embodiment.

The X-axis direction modification section 134 determines whether the modification amount Ex in the X-axis direction is "0" (S110). When the modification amount Bx is "0", bold modification in the X-axis direction is unnecessary. Thus, the X-axis direction modification section 134 transfers the intermediate character pattern to the Y-axis direction modification section 136, and then the procedure goes to bold processing in the Y-axis direction (S200) (S110-YES).

When the modification amount Bx is not "0", bold modification in the X-axis direction is necessary. Thus, the X-axis direction modification section 134 starts bold processing in the X-axis direction (S110-NO). First, the X-axis direction modification section 134 initializes into "0" an operator m that sets forth the processing target row (S120). Here, the maximum value in the Y-axis direction of the drawing area of the character to assumed to be "M−1". Further, the total number of elements in the processing target line (the operator m) is assumed to be Em_X.

In bold processing in the X-axis direction, the X-axis direction modification section 134 updates the start point and the end point in accordance with the modification amount Bx for all elements located at the 0th or the (M−1)-th line in the Y-axis direction of the intermediate character pattern. Thus, the X-axis direction modification section 134 determines whether the operator m is smaller than M (S130).

When the operator m is smaller than M, the X-axis direction modification section 134 initializes into "0" the operator e that sets forth the processing target element in the processing target line (the operator m) (S140), and then determines whether the operator e is smaller than Em_X (S150).

When a plurality of elements belong to the same line, as for the order of processing of the processing target elements (the operator e), the element having the smallest start point value is processed first in order that the overall processing efficiency should be improved (useless processing should be avoided).

When the operator e is smaller than Em_X (S150-YES), the X-axis direction modification section 134 updates the start point and the end point of the intermediate character pattern of the processing target element (the operator e) in accordance with the modification amount Bx (S152). After that, the X-axis direction modification section 134 adds "1" to the operator e (S154), and then the procedure returns to step S150 so as to start processing for the next element.

When the operator e reaches Em_X (S150-NO), this indicates that the bold processing in the X-axis direction has been completed for all elements in the processing target line (the operator m). Thus, the X-axis direction modification section 134 adds "1" to the operator m (S158), and then the procedure returns to step S130 so as to start processing for the next line.

When the operator m reaches M, this indicates that the bold processing in the X-axis direction has been completed. Thus, the intermediate character pattern modification section 130 transfers the processed intermediate character pattern TP_X to the Y-axis direction modification section 136, and then the procedure goes to bold processing in the Y-axis direction (S200) (S130-NO).

[Y-Axis Direction Processing]

Figure 4:
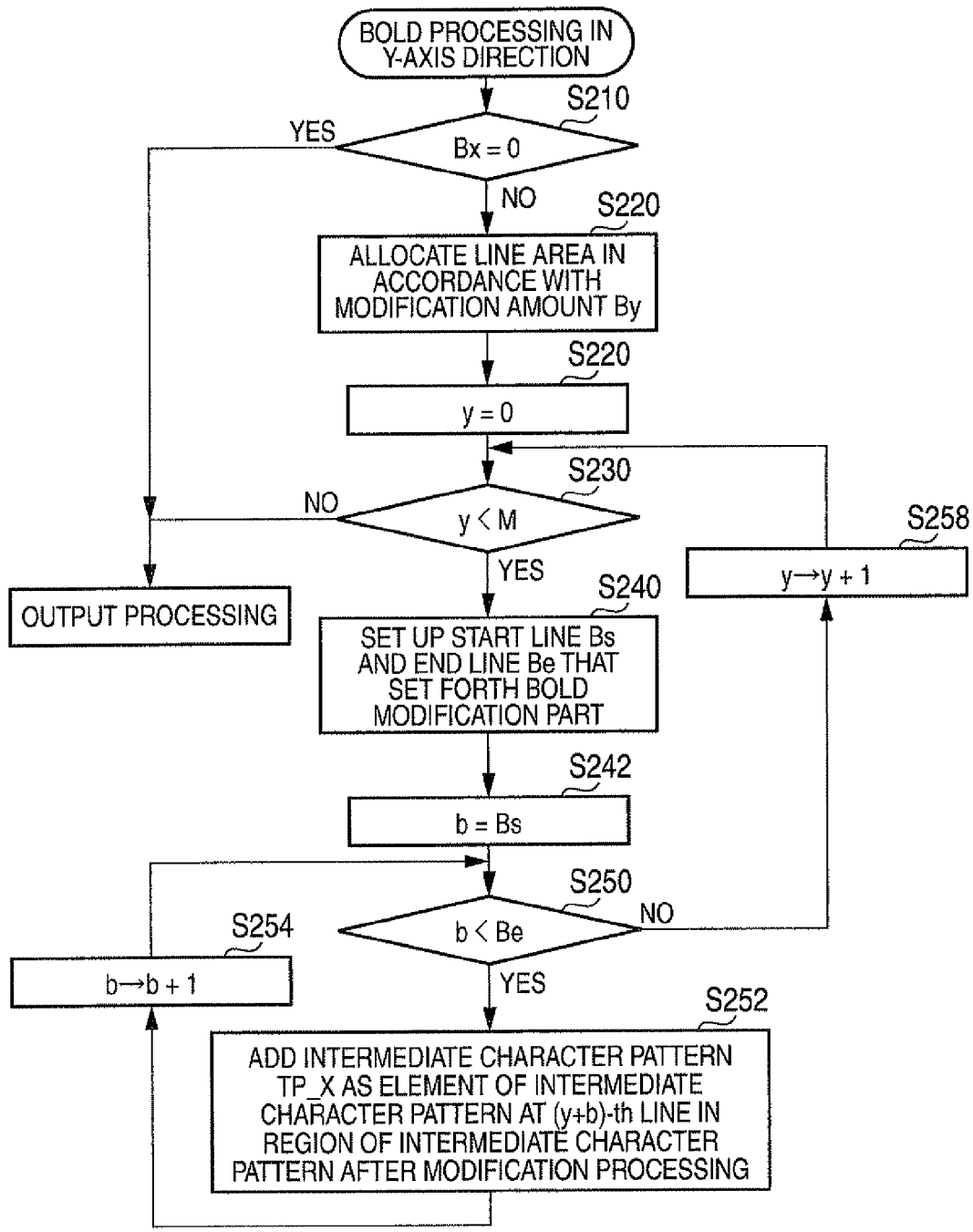
FIG. 4 is a flow chart describing bold processing in the Y-axis direction according to a first exemplary embodiment.

FIG. 4 is a flow chart describing the bold processing in the Y-axis direction (especially, the operation of the Y-axis direction modification section 136) performed in the intermediate character pattern modification section 130 according to the first exemplary embodiment.

The Y-axis direction modification section 136 determines whether the modification amount By in the Y-axis direction is "0" (S210). When the modification amount By is "0", bold modification in the Y-axis direction is unnecessary. Thus, the Y-axis direction modification section 136 transfers the intermediate character pattern TP_X to the character output section 140, and then the procedure goes to output processing (S210-YES).

When the modification amount By is not "0", bold modification in the Y-axis direction is necessary. Thus, the Y-axis direction modification section 136 starts bold processing in the Y-axis direction (S210-NO). First, on the basis of the modification amount By in the Y-axis direction, the Y-axis direction modification section 136 allocates a region corresponding to a line to be added by bold modification processing in the Y-axis direction (S220). Then, the Y-axis direction modification section 136 initializes into "0" an operator y that sets forth the processing target row (S222).

In bold processing in the Y-axis direction, the Y-axis direction modification section 136 generates an intermediate character pattern for the bold modification in the Y-axis direction, and then adds elements so as to generate a modified intermediate character pattern TP_Y. That is, the bold modification in the Y-axis direction is achieved by duplicating each element constituting the intermediate character pattern in the processing target row, by the modification amount By in the Y-axis direction.

Thus, the Y-axis direction modification section 136 determines whether the operator y is smaller than M (S230). When the operator y is smaller than M, on the basis of the modification amount By, the Y-axis direction modification section 136 sets up the start line Bs and the end line Be that set forth the range of bold modification in the Y-axis direction (S140), and then initializes the operator b to be the start line Bs (S242). For example, when bold processing is to be performed by the same amount in both of the upper and lower directions of the character, the negative value of the modification amount By is set to be the start line Bs, while the modification amount By is set to be the end line Be. When bold processing is to be performed by a different amount in each of the upper and lower directions of the character, the negative value of the down modification amount By_D is set to be the start line Bs, while the up modification amount By_U is set to be the end line Be. When bold processing is to be performed in the down direction alone of the character, the negative value of the down modification amount By_D is set to be the start line Bs, while "0" is set to be the end line Be.

The Y-axis direction modification section 136 determines whether the operator b is smaller than the end line Be (S250). When the operator b is smaller than the end line Be, the intermediate character pattern TP_X in the processing target row (the operator y) is added as an element of the intermediate character pattern at the (y+b)-th line in the region of the intermediate character pattern after the modification processing (S250-YES and S252). After that, the Y-axis direction modification section 136 adds "1" to the operator b (S254), and then the procedure returns to step S250 so that the procedure goes to processing for the next bold modification in the Y-axis direction.

When the operator b reaches the end line Be (S250-NO), this indicates that the bold processing in the Y-axis direction has been completed in the processing target line (the operator y). Thus, the Y-axis direction modification section 136 adds "1" to the operator y (S258), and then the procedure returns to step S230 so as to start processing for the next line.

When the operator y reaches M, this indicates that the bold processing in the Y-axis direction has been completed for all lines. Thus, the intermediate character pattern modification section 130 transfers the processed intermediate character pattern TP_Y to the character output section 140 (S230-NO).

Example of Application

Figure 5A:
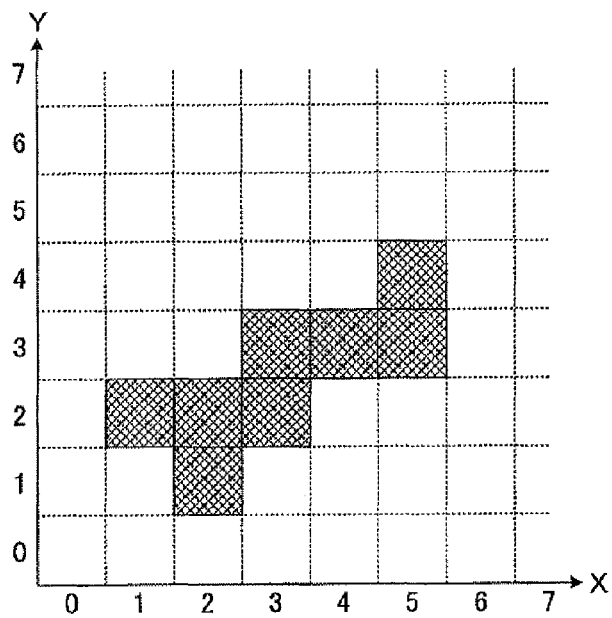
FIG. 5A is a diagram showing the relation between a particular character and its intermediate character pattern.
Figure 5B:
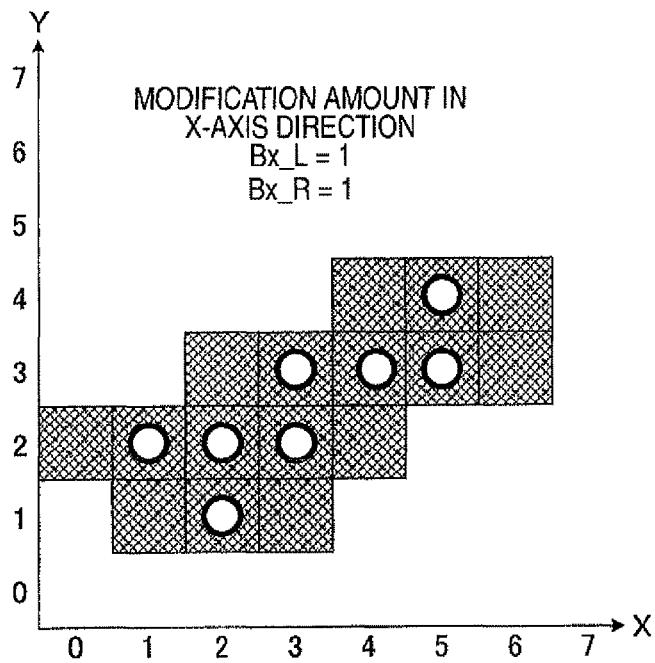
FIG. 5B is a diagram showing a result of bold processing in the X-axis direction performed on a character shown in FIG. 5A.
Figure 5C:
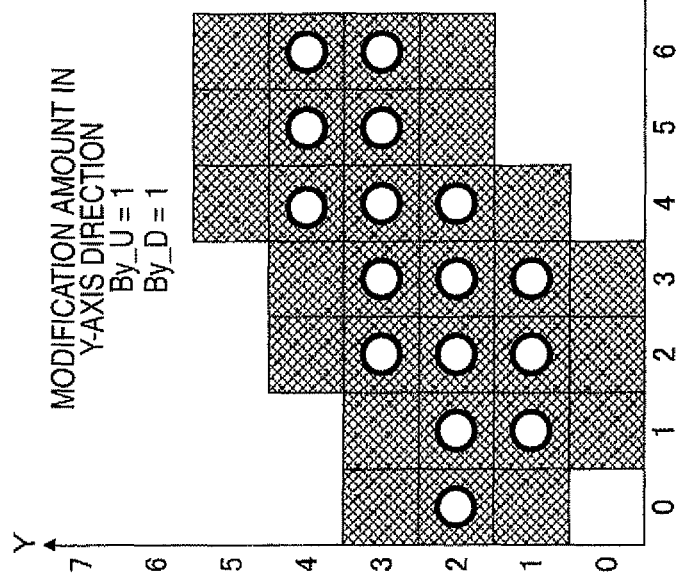
FIG. 5C is a diagram showing a result of bold processing in the Y-axis direction performed on a character shown in FIG. 5B.

FIGS. 5A to 5C are diagrams describing an example of application according to the first exemplary embodiment. FIG. 5A is a diagram showing the relation between a particular character and its intermediate character pattern. FIG. 5B is a diagram showing a result of bold processing in the X-axis direction performed onto a character (an intermediate character pattern) shown in FIG. 5A. FIG. 5C is a diagram showing a result of bold processing in the Y-axis direction performed onto the character (an intermediate character pattern) shown in FIG. 5B.

FIG. 5A part (1) shows a particular character in the form of a bit map. FIG. 5A part (2) shows its intermediate character pattern TP. In the first row from the bottom, the second pixel alone is to be printed. Thus, the structure of the intermediate character pattern is PT(2,2). In the second row from the bottom, the first pixel to the third pixel are to be printed. Thus, the structure of the intermediate character pattern is PT(1,3). In the third row from the bottom, the third pixel to the fifth pixel are to be printed. Thus, the structure of the intermediate character pattern is PT(3,5). In the fourth row from the bottom, the fifth pixel alone is to be printed. Thus, the structure of the intermediate character pattern is PT(5,5).

On the basis of the modification amount Bx (the modification amount Bx_L and the modification amount Bx_R) in the X-axis direction, the X-axis direction modification section 134 changes the values of the start point and the end point of each element of the intermediate character pattern shown in FIG. 5A part (2). FIG. 5B shows a case that bold processing is performed on the character shown in FIG. 5A part (1) by using the modification amount Bx_L=1 and the modification amount Bx_R=1. FIG. 5B part (1) shows in the form of a bit map the character obtained after the bold processing in the X-axis direction. FIG. 5B part (2) shows the intermediate character pattern TP_X obtained after the bold processing in the X-axis direction.

In the element constituting the intermediate character pattern TP_X, when the bold processing with the modification amount Bx_L=1 and the modification amount Bx_R=1 is applied on the intermediate character pattern shown in FIG. 5A part (2), the start point is shifted leftward by "1" and hence the value of the start point is decremented by "1", while the end point is shifted rightward by "1" and hence the value of the end point is incremented by "1". As a result, the intermediate character pattern is changed as shown in FIG. 5B part (2).

Next, the Y-axis direction modification section 136 performs bold processing in the Y-axis direction. At that time, on the basis of the intermediate character pattern TP_X having undergone the bold processing in the X-axis direction shown in FIG. 5B part (2), the Y-axis direction modification section 136 generates elements for the Y-direction modification so as to generate an intermediate character pattern TP_Y having undergone bold processing in the Y-axis direction.

FIG. 5C shows a case that bold processing with the modification amount By_D=1 and the modification amount By_U=1 is performed on the character having undergone bold processing in the X-axis direction shown in FIG. 5B part (1). FIG. 5C part (1) shows in the form of a bit map the character obtained after the bold processing in the Y-axis direction. FIG. 5C part (2) shows the intermediate character pattern TP_Y obtained after the bold processing in the Y-axis direction.

In this example, in addition to the intermediate character pattern TP_X (=TP_Y±0) itself after the bold processing in the X-axis direction, an intermediate character pattern TP_X−1 obtained by shifting downward by one row and an intermediate character pattern TP_X+1 obtained by shifting upward by one row are generated. Then, a set of these constitutes the intermediate character pattern TP_Y.

The character output section 140 performs output processing on the basis of the intermediate character pattern TP_Y received from the intermediate character pattern modification section 130 (equal to the intermediate character pattern TP_X in the case of absence of X-axis direction bold processing). Since the element of the intermediate character pattern TP_Y describes information concerning the start point and the end point, it is sufficient that processing in which pixels from the start point to the end point are adopted as the output target is performed.

As seen from FIG. 5C, when a plurality of elements are present in the processing target line, duplicate output at the same pixel position can occur. However, the output state of the character is equivalent to that obtained in a case that logical sum operation is performed on the bit map.

Second Exemplary Embodiment

[Apparatus Configuration]

FIG. 6 is a diagram showing a configuration of a character output apparatus according to a second exemplary embodiment. The character output apparatus 1B according to the second exemplary embodiment is constructed on the basis of the character output apparatus 1A according to the first exemplary embodiment, and has a feature that the intermediate character pattern modification section 130 has an information amount compression section 138.

The information amount compression section 138 resolves the situation that in the configuration of the first exemplary embodiment, when a plurality of elements are present in the processing target line, duplicate output at the same pixel position occurs. For this purpose, overlap between a plurality of elements in the processing target line is checked and then overlapping elements are merged so that the pixel position of the character to be printed can be expressed by elements in a number as small as possible (preferably, the minimum number). As a result, the amount of information (the number of elements) of the intermediate character pattern is compressed (optimized). Preferably, in order that the number of elements should be reduced even when adjacent elements are successive, the successive elements are merged into one so that the amount of information (the number of elements) of the intermediate character pattern is compressed. In the following description in the present specification, the structure of each element in the X-axis direction of the optimized intermediate character pattern is expressed as PTOP (start point, end point).

[X-Axis Direction Information Amount Compression Processing]

FIGS. 7A to 7C are diagrams describing the bold processing in the X-axis direction performed in the intermediate character pattern modification section 130 in a case that the information amount compression section 138 is operated. Here, FIG. 7A is a flow chart describing the bold processing in the X-axis direction performed in the intermediate character pattern modification section 130 in a case that the information amount compression section 138 is operated. FIG. 7B is a flow chart describing the operation of information amount compression processing in the X-axis direction performed by the information amount compression section 138. FIG. 7C is a diagram showing an example of a character formed before and after information amount compression processing in the X-axis direction and its intermediate character pattern.

The following description is given for a case that in the X-axis direction processing shown in FIG. 3, when a plurality of elements belong to the same line, the element having the smallest start point value is processed first.

According to the second exemplary embodiment, when the operator e reaches Em_X (S150-NO), the information amount compression section 138 checks overlap of the elements in the processing target line (the operator m), and then optimizes the intermediate character pattern such that the print position for the character is expressed by the minimum number of elements (S156). This processing is referred to as "element optimization processing for the m-th line". After that, the X-axis direction modification section 134 adds "1" to the operator m (S158), and then the procedure returns to step S130 so as to start processing for the next line.

FIG. 7B shows a detailed procedure of element optimization processing for the m-th line performed by the information amount compression section 138 (S156). The information amount compression section 138 initializes into "0" the operator e that sets forth the processing target element in the processing target line (the operator m) (S330), and then determines whether the operator e is smaller than Em_X (S332).

When the operator e is smaller than Em_X (S332-YES), the information amount compression section 138 scans all elements in the processing target line (the operator m) so as to check successiveness and overlap of the elements, and then merges the successive or overlapping elements into one. Here, from the perspective of avoiding the duplicate output at the same pixel position, the merging in the case of being successive is not indispensable. However, from the perspective of reducing the number of elements, the merging is preferable.

Specifically, the structure of the e-th element is changed into PT_e(Se,Ee), while the structure of the (e+1)-th element is changed into PT_e+1(Se+1,Ee+1). The information amount compression section 138 determines whether the start point Se+1 of the (e+1)-th element is located between the start point Se and the end point Ee of the e-th element (S334). When merging is not to be performed in the case of being successive, it is determined whether "Se<Se+1<Ee" is satisfied. When merging is to be performed in the case of being successive, it is determined that whether "Se<Se+1≤Ee" is satisfied.

When the condition is satisfied (S334-YES), the information amount compression section 138 identifies the structure PTOP_e+1(start point, end point) of the (e+1)-th element after the processing as described below, and then merges the e-th and the (e+1)-th elements into one (S336). Specifically, the value of the start point in the structure of the (e+1)-th element after the processing is replaced by the value of the start point in the structure of the e-th element immediately before the present processing, so that PTOP_e+1(Se,Ee+1) is obtained. Further, the information amount compression section 138 nullifies the values of the start point and the end point of the e-th element.

When the condition is not satisfied (S334-NO) or alternatively when the merging processing for the start point (S336) has been completed, the information amount compression section 138 adds "1" to the operator e (S338), and then the procedure returns to step S332 so as to start processing for the next element.

When the procedure returns to step S332, in a case that merging processing (S336) has been performed, the structure of the e-th element after the merging processing (corresponding to the (e+1)-th element in the preceding processing) is adopted at step S334. By virtue of this approach, for example, even when the e-th, the (e+1)-th, and the (e+2)-th elements are successive, or alternatively even when the e-th and the (e+1)-th elements overlap with each other and the (e+1)-th and the (e+2)-th elements overlap with each other, or alternatively even when the e-th, the (e+1)-th, and the (e+2)-th elements overlap with each other, the processing may be performed merely by successively incrementing the operator e so that the processing is completed without any inconvenience.

When the operator e reaches Em_X (S332-NO), this indicates that the information amount compression processing in the X-axis direction has been completed for all elements in the processing target line (the operator m).

In the first example shown in FIG. 7C part (1), an example of a character formed before and after the "element optimization processing for the m-th line" (S334-YES) and an intermediate character pattern is shown in a case that the condition is satisfied for two elements. In the second example shown in FIG. 7C part (2), an example of a character formed before and after the "element optimization processing for the m-th line" and an intermediate character pattern is shown in a case that three elements are successive to each other. In the third example shown in FIG. 7C part (3), an example of a character formed before and after the "element optimization processing for the m-th line" and an intermediate character pattern is shown in a case that three elements overlap with each other. In the fourth example shown in FIG. 7C part (4), an example of a character formed before and after the "element optimization processing for the m-th line" and an intermediate character pattern is shown in a case that the condition is not satisfied (S334-NO). The total number of elements is reduced, while the output state of the character is equivalent to that obtained by logical sum operation on the bit map.

Here, in contrast to the case of information amount compression processing in the Y-axis direction described later, elements cannot be successive before the bold processing in the X-direction and hence the relation "Se<Ee<Se+1<Ee+1" is satisfied. Thus, "Ee+Bx_R>Ee+1+Bx_R" is not satisfied.

[Y-Axis Direction Information Amount Compression Processing]

Figure 8A:
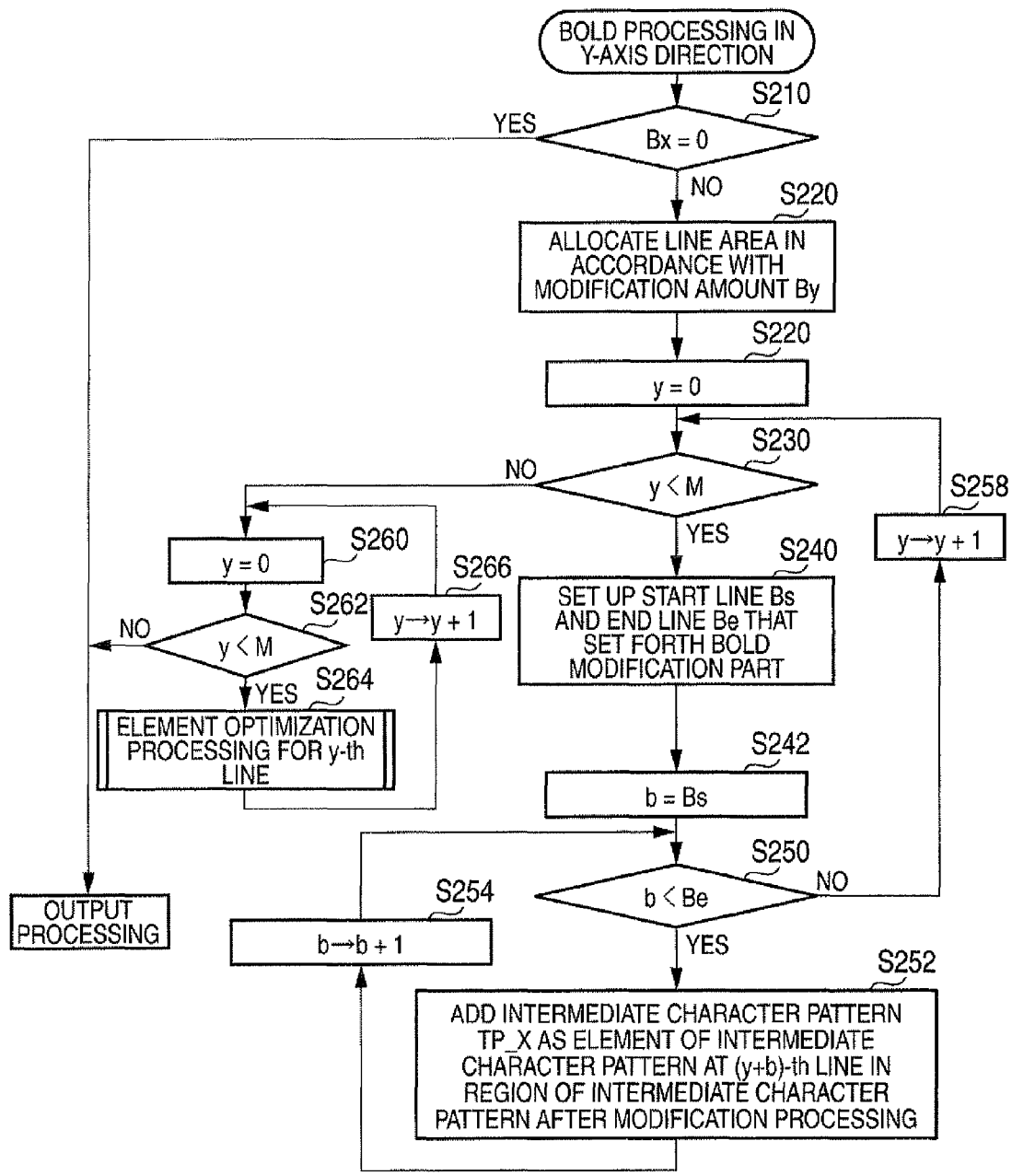
FIG. 8A is a flow chart describing bold processing in the Y-axis direction according to a second exemplary embodiment.
Figure 8B:
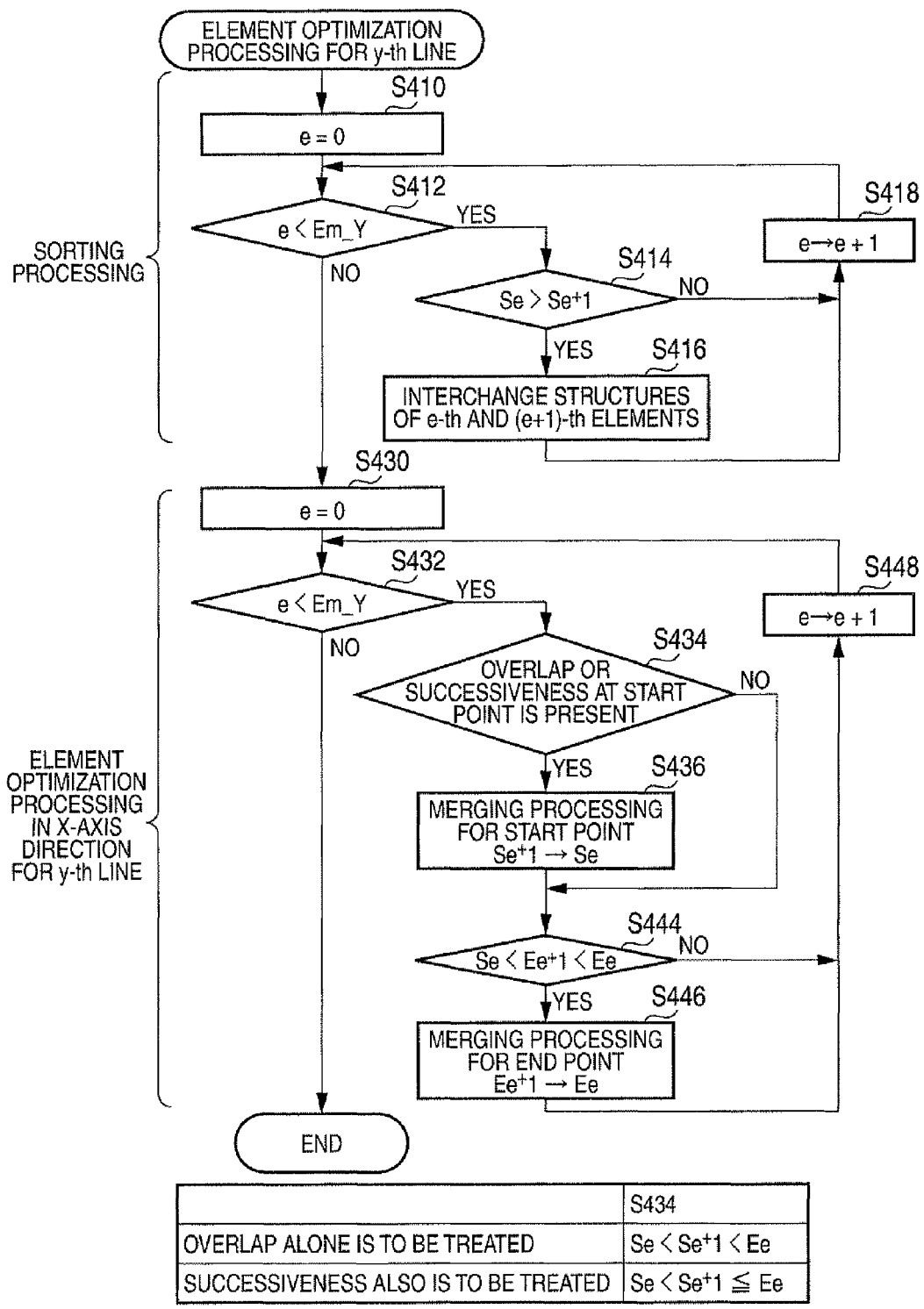
FIG. 8B is a flow chart describing the operation of information amount compression processing in the Y-axis direction according to a second exemplary embodiment.
Figure 8C:
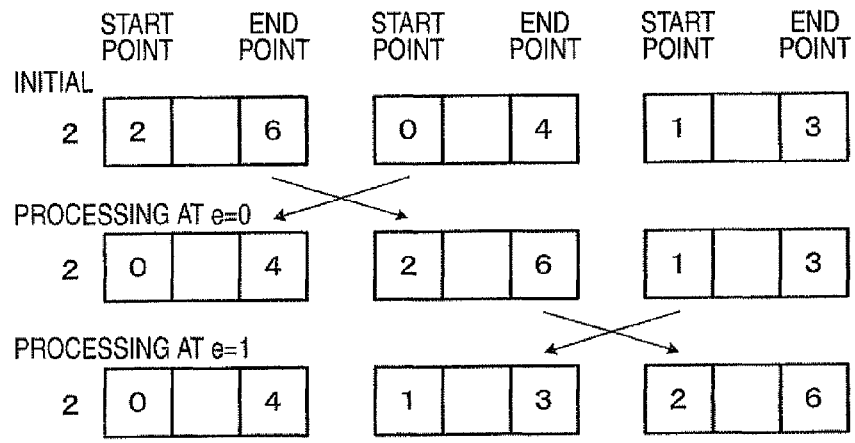
FIG. 8C is a diagram showing an example of a character formed before and after sorting processing in information amount compression processing in the Y-axis direction and its intermediate character pattern according to a second exemplary embodiment.
Figure 8E:
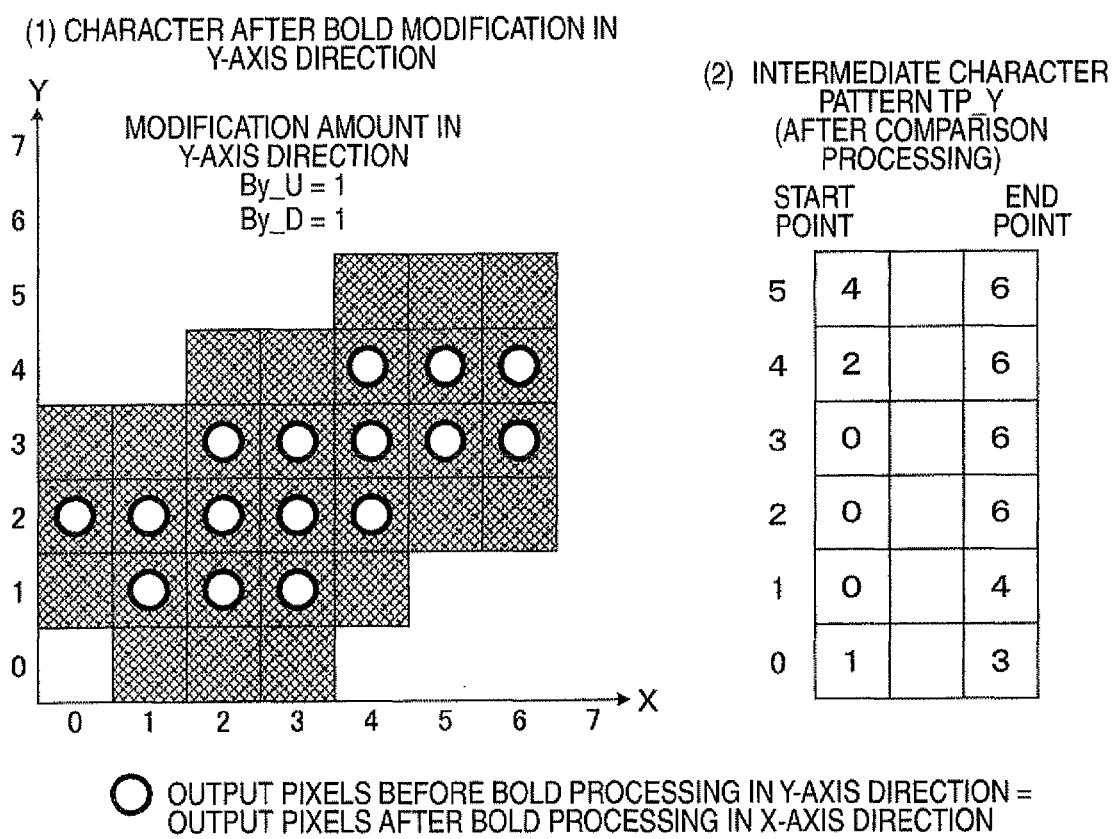
FIG. 8E is a diagram showing an example of a character formed before and after information amount compression processing in the Y-axis direction and its intermediate character pattern according to a second exemplary embodiment.

FIGS. 8A to 8E are diagrams describing the bold processing in the Y-axis direction performed in the intermediate character pattern modification section 130 in a case that the information amount compression section 138 is operated. Here, FIG. 8A is a flow chart describing the bold processing in the Y-axis direction performed in the intermediate character pattern modification section 130 in a case that the information amount compression section 138 is operated. FIG. 8B is a flow chart describing the operation of information amount compression processing in the Y-axis direction performed by the information amount compression section 138. FIG. 8C is a diagram showing an example of a character formed before and after sorting processing in the information amount compression processing in the Y-axis direction and its intermediate character pattern. FIG. 8D is a diagram showing an example of a character formed before and after information amount compression processing in the X-axis direction in the information amount compression processing in the Y-axis direction and its intermediate character pattern. FIG. 8E is a diagram showing an example of a character formed before and after information amount compression processing in the Y-axis direction and its intermediate character pattern.

According to the second exemplary embodiment, when the operator y reaches M (S230-NO), the information amount compression section 138 initializes into "0" the operator y that sets forth the processing target row (S260). After that, the information amount compression section 138 determines whether the operator y is smaller than or equal to M (S262).

When the operator y is smaller than or equal to M, the information amount compression section 138 performs element optimization on all lines and then generates an intermediate character pattern to be transferred to the character output section 140 (S264). This processing is referred to as "element optimization processing for the y-th line". After that, the information amount compression section 138 adds "1" to the operator y (S266), and then the procedure returns to step S260 so as to start processing for the next line.

When the operator y reaches M, this indicates that the information amount compression processing in the Y-axis direction has been completed for all lines.

FIG. 8B shows a detailed procedure of element optimization processing for the y-th line performed by the information amount compression section 138 (S264). In the following description, the total number of elements in the processing target line (the operator y) after the bold processing in the Y-axis direction shown in FIG. 4A has been completed is assumed to be Em_Y.

The information amount compression section 138 performs sorting on the basis of the start point of each element. In the sorting processing, the start points of the elements belonging to the same line are compared with each other. Then, the element having the smallest start point is moved to the top position of the elements belonging to the same line. This operation is performed on all elements. Specifically, the information amount compression section 138 initializes into "0" the operator e that sets forth the processing target element in the processing target line (the operator y) (S410), and then determines whether the operator e is smaller than Em_Y (S412).

When the operator e is smaller than Em_Y (S412-YES), on the basis of the start point of each element in the processing target line (the operator y), the information amount compression section 138 rearranges the elements in the descending order of the start point of each element.

Specifically, the structure of the e-th element is changed into PT_e(Se,Ee), while the structure of the (e+1)-th element is changed into PT_e+1(Se+1,Ee+1). The information amount compression section 138 determines whether the start point Se+1 of the (e+1)-th element is smaller than the start point Se of the e-th element (Se>Se+1) (S414).

When the condition is satisfied (S414-YES), the information amount compression section 138 interchanges the structures of the e-th and the (e+1)-th elements after the processing (S416).

When the condition is not satisfied (S414-NO) or alternatively when the sorting processing (S416) has been completed, the information amount compression section 138 adds "1" to the operator e (S338), and then the procedure returns to step S412 so as to start processing for the next element.

When the procedure returns to step S412, in a case that sorting processing (S416) has been performed, the structure of the e-th element after the sorting processing (corresponding to the (e+1)-th element in the preceding processing) is adopted at step S414. By virtue of this approach, the processing may be performed merely by successively incrementing the operator e so that the sorting processing is completed without any inconvenience.

When the operator e reaches Em_Y (S412-NO), this indicates that the sorting processing has been completed for all elements in the processing target line (the operator y). Thus, the information amount compression section 138 checks overlap of the elements in the processing target line, and then optimizes the intermediate character pattern such that the print position for the character is expressed by the minimum number of elements. This processing is referred to as "element optimization processing in the X-axis direction for the y-th line".

The "element optimization processing in the X-axis direction for the y-th line" is basically the same as the "element optimization processing for the m-th line" described in FIGS. 7A to 7C. The difference is that in place of the total number Em_X of elements, the total number Em_Y of elements in the processing target line after the bold processing in the Y-axis direction has been completed is used. As for processing employed in common in these, processing step numbers in FIG. 8B are changed from 300s used in FIG. 7B to 400s.

Basically, this processing is similar to that shown in FIG. 70. The difference is the possibility of a case that one element completely contain another element and hence "Ee+Bx_R>Ee+1+Bx_R" is satisfied. Here, since sorting processing has been performed, "Se−Bx_L>Se+1−Bx_L" is not satisfied, although "Se−Bx_L=Se+1−Bx_L" can be satisfied.

For the purpose of treatment of the case "Ee+Bx−R>Ee+1+Bx_R" when the condition "Se<Se+1<Ee" is satisfied (S434-YES), the information amount compression section 138 replaces the value of the start point in the structure of the (e+1)-th element after the processing by the value of the start point in the structure of the e-th element immediately before the present processing (S436).

When the condition is not satisfied (S434-NO), or alternatively when the merging processing for the start point (S436) has been completed, the information amount compression section 138 determines whether the end point Ee+1 of the (e+1)-th element is located between the start point Se and the endpoint Ee of the e-th element (S444). It is sufficient that whether "Se<Ee+1<Ee" is satisfied is determined.

When the condition is satisfied (S444-YES), the information amount compression section 138 identifies the structure PTOP_e+1 (start point, end point) of the (e+1)-th element after the processing as described below, and then merges the e-th and the (e+1)-th elements into one (S336). Specifically, the value of the end point in the structure of the (e+1)-th element after the processing is replaced by the value of the end point in the structure of the e-th element immediately before the present processing. Further, the information amount compression section 138 nullifies the values of the start point and the end point of the e-th element.

When the condition is not satisfied (S444-NO) or alternatively when the merging processing for the end point (S446) has been completed, the information amount compression section 138 adds "1" to the operator e (S448), and then the procedure returns to step S432 so as to start processing for the next element.

For example, for elements S1 and S2 adopted as processing targets, the X-coordinate of the start point of S1 is denoted by Six, while the end point X-coordinate is denoted by Six. Similarly for the element S2, the X-coordinate of the start point is denoted by S2$x$, while the end point X-coordinate is denoted by E2$x$. Then, for S1, whether "S1$x$<S2$x$<E1$x$" is satisfied is determined for all remaining elements starting at S2. Further, when the processing for the first element and the remaining elements (the second, the third, . . . elements) has been completed, the processing for the second element and the remaining elements (the third, the fourth, . . . elements) is repeated for the remaining elements. This processing is performed on all combinations of the elements.

FIG. 8C shows an example that sorting processing is performed to the result (FIG. 8C part (1)) of the bold processing in the Y-axis direction shown in FIG. 5C. FIG. 8C part (2) shows the course of transition of the intermediate character pattern in the sorting processing, with focusing attention on the second line. FIG. 8C part (3) shows an example of the intermediate character pattern obtained after the overall sorting processing.

In FIG. 8D part (1), an example of a character formed before and after the "element optimization processing in the X-direction for the y-th line" and an intermediate character pattern is shown in a case that "Se<Se+1<Se" alone is satisfied for two elements (S434-YES and S444-NO). In FIG. 8D part (2), an example of a character formed before and after the "element optimization processing in the X-direction for the y-th line" and an intermediate character pattern is shown in a case that "Se<Ee+1<Ee" alone is satisfied for two elements (S434-NO and S444-YES). In FIG. 8D part (3), an example of a character formed before and after the "element optimization processing in the X-direction for the y-th line" and an intermediate character pattern is shown in a case that "Se<Se+1<Ee" is satisfied (S434-YES) and "Se<Ee+1<Ee" is also satisfied (S444-YES) for two elements. In FIG. 8D part (4), an example of a character formed before and after the "element optimization processing in the X-direction for the y-th line" and an intermediate character pattern is shown in a case that "Se<Se+1<Ee" is not satisfied (S434-NO) and "Se<Ee+1<Ee" is also not satisfied (S444-NO) for two elements. In each case, the total number of elements is reduced, while the output state of the character is equivalent to that obtained by logical sum operation on the bit map.

FIG. 8E shows an example that sorting processing and "element optimization processing in the X-axis direction for the y-th line" are performed for all lines onto the result of the bold processing in the Y-axis direction shown in FIG. 50.

[Modification of Information Amount Compression Processing]

FIG. 8F is a flow chart describing the operation of information amount compression processing in the X-axis direction and the Y-axis direction performed by the information amount compression section 138 according to the second exemplary embodiment. This is a modification to those shown in FIG. 7B and FIG. 8B. As for processing employed in common in these, processing step numbers in FIG. 8F are changed from 400s used in FIG. 8B to 500s.

As described above in the Y-axis direction information amount compression processing, the "element optimization processing of the y-th line" is different from the "element optimization processing for the m-th line" in the point that sorting processing is present. Further, the "element optimization processing in the X-axis direction for the y-th line" is similar to the "element optimization processing for the m-th line". Furthermore, in the description given above, it has been assumed that in the X-axis direction processing shown in FIG. 3, when a plurality of elements belong to the same line, the element having the smallest start point value is processed first. However, when this assumption is not satisfied, it is sufficient that sorting processing is performed. With focusing attention on these points, in the present modification, the detailed procedure at step S156 of FIG. 3 and step S264 of FIG. 4 are made common to each other.

When the procedure goes to the information amount compression processing at step S156 or step S264, first, the information amount compression section 138 determines whether the processing corresponds to the "element optimization processing of the y-th line", that is, the procedure has come from step S264 (S502). When the condition is satisfied (S502-

YES), the total number Em of elements set to be the total number Em_Y of elements in the processing target line after the bold processing in the Y-axis direction has been completed (S504), and then starts at the sorting processing. On completion of the sorting processing, the information amount compression section 138 performs "element optimization processing in the X-axis direction for the y-th line".

On the other hand, when the procedure has not come from step S264 (S502-NO), the information amount compression section 138 sets the total number Em of elements to be the total number Em_X of elements in the processing target line obtained before the bold processing in the X-axis direction (S506). Then, in the X-axis direction processing shown in FIG. 3, it is determined whether when a plurality of elements belong to the same line, the element having the smallest start point value is processed first, that is, whether sorting processing is necessary (S508). When sorting processing is necessary (S508-YES), the procedure starts at the sorting processing. On completion of the sorting processing, the information amount compression section 138 performs "element optimization processing for the m-th line". On the other hand, when the sorting processing is not necessary (S508-NO), the sorting processing is skipped and hence the "element optimization processing for the m-th line" is performed.

Third Exemplary Embodiment

[Apparatus Configuration]

Figure 9:
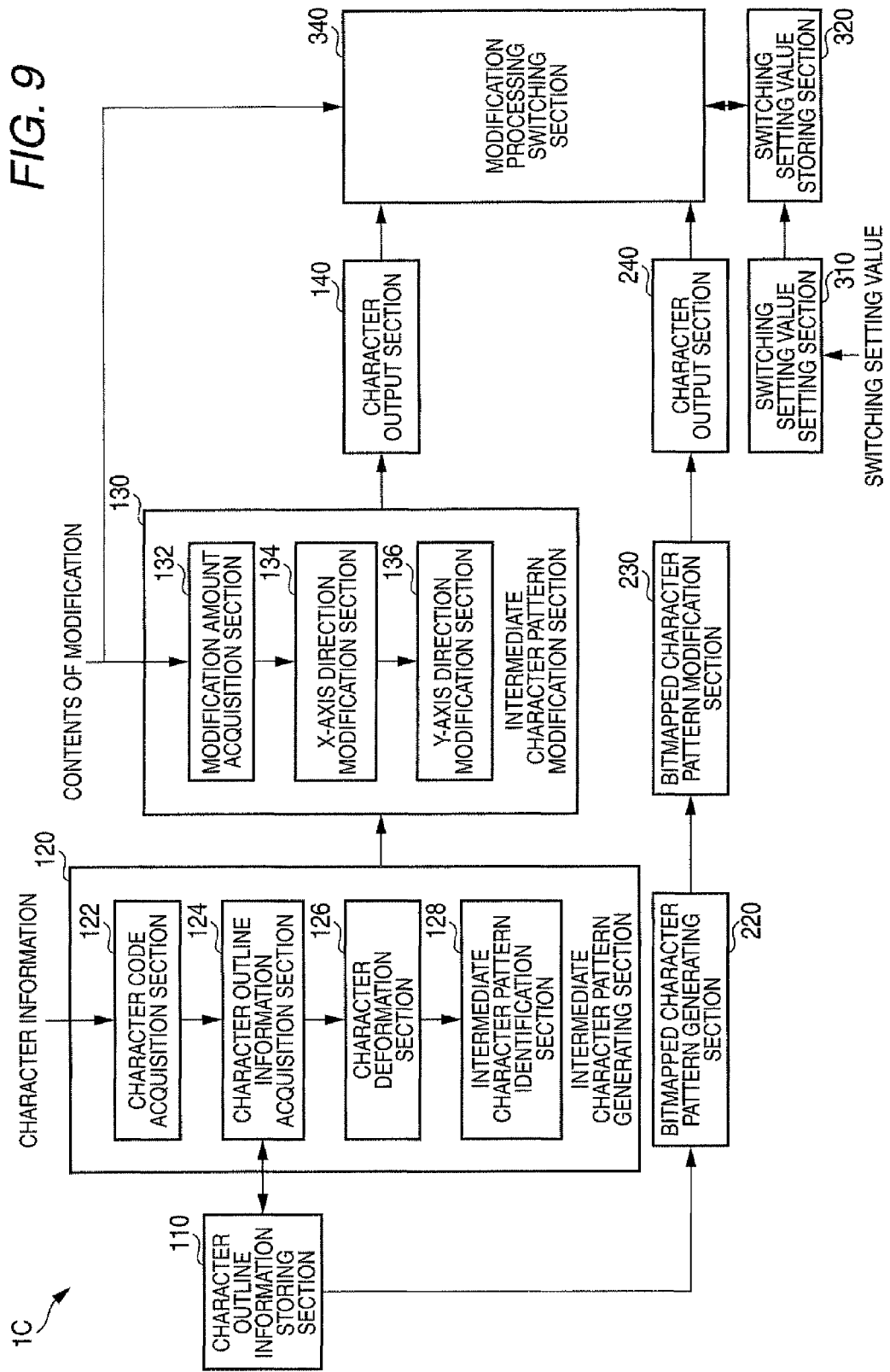
FIG. 9 is a diagram showing a configuration of a character output apparatus according to a third exemplary embodiment.

FIG. 9 is a diagram showing a configuration of a character output apparatus according to a third exemplary embodiment. FIG. 9 shows a modification to the character output apparatus 1A according to the first exemplary embodiment shown in FIG. 1. However, the mechanism according to the third exemplary embodiment is similarly applicable to the character output apparatus 1B according to the second exemplary embodiment shown in FIG. 6.

The character output apparatus 1C according to the third exemplary embodiment is based on the character output apparatus 1A according to the first exemplary embodiment and the character output apparatus 1B according to the second exemplary embodiment, and has a feature that a mechanism (referred to as bold processing using a bitmapped character pattern, hereinafter) of shifting the position of the bitmapped character pattern and performing logical sum operation so as to generate a bold character pattern of the bitmapped character is employed.

In accordance with the contents of bold processing, the bold processing using an intermediate character pattern and the bold processing using a bitmapped character pattern employed in the first and the second exemplary embodiments are switched to each other.

Here, the statement that "in accordance with the contents of bold processing, . . . bold processing is switched to each other" indicates that the bold processing is switched to each other in accordance with the character size, or alternatively whether the bold processing is to be performed in the X-axis direction alone (that is, bold modification in the Y-axis direction is not included), or alternatively the bold modification amount (the modification amount Bx in the X-axis direction and the modification amount By in the Y-axis direction).

When the modification processing is switched into a technique suitable for the contents of bold processing, bold processing is realized that has no difference from the bold modification using a bitmapped character pattern and that has a low processing load (that is, a high speed) regardless of the character size, the modification direction, and the modification amount value.

For the purpose of this approach, the character output apparatus 1C according to the third exemplary embodiment has: a bitmapped character pattern processing section 5 provided with a bitmapped character pattern generating section 220, a bitmapped character pattern modification section 230, and a character output section 240; a switching setting value setting section 310; a switching setting value storing section 320; and a modification processing switching section 340.

When a bold character is to be generated in a case that a bold typeface is not provided, the bitmapped character pattern generating section 220 generates a bitmapped character pattern on the basis of the character outline information stored in the character outline information storing section 110. That is, from the character outline information storing section 110, the bitmapped character pattern generating section 220 acquires outline information of the character specified by the character code.

Then, after acquiring the character outline information, the bitmapped character pattern generating section 220 performs expansion, reduction, or deformation on the character outline in accordance with the specified character size and the specified deformation mode, so as to generate a bitmapped character pattern.

For the purpose of implementation of this function, specifically, although not illustrated, the bitmapped character pattern generating section 220 has a character code acquisition section, a character outline information acquisition section, a character deformation section, and a bitmapped character pattern identification section.

The bitmapped character pattern modification section 230 performs bold processing in a specified modification direction by a specified modification amount onto the bitmapped character pattern generated in the bitmapped character pattern generating section 220 so as to generate a bold-modified bitmapped character pattern, and then transfers the data to the character output section 240.

For the purpose of implementation of this function, specifically, although not illustrated, the bitmapped character pattern modification section 230 has a modification amount acquisition section and a modification section. In bold modification, for example, similarly to the mechanism described in Patent Document 1, the position of the bitmapped character pattern is moved, and then logical sum operation is performed so that a bold character pattern of the bitmapped character is generated.

The character output section 240 receives information concerning the presence or absence of bold processing from a control section (not shown). The character output section 240 outputs a character on the basis of the bitmapped character pattern BP generated in the bitmapped character pattern generating section 220 or the bold-processed bitmapped character pattern BP_M generated in the bitmapped character pattern modification section 230. Specifically, the character output section 240 refers to the bitmapped character pattern BP from the bitmapped character pattern generating section 220 in the case of absence of bold processing, and refers to the bitmapped character pattern BP_M from the bitmapped character pattern modification section 230 in the case of presence of bold processing.

Here, the bitmapped character pattern processing section 5 may be similar to that of the mechanism described in reference 1. Thus, detailed description is omitted for the bitmapped character pattern generating section 220, the bitmapped character pattern modification section 230, and the character output section 240.

The switching setting value setting section 310 receives from a user a switching setting value (a determination index value) used at the time of switching to each other the bold processing using an intermediate character pattern and the bold processing using a bitmapped character pattern, and then sets up the value. The switching setting value storing section 320 stores in a storage medium the switching setting value set up by the switching setting value setting section 310 and a default switching setting value (a predetermined fixed value). That is, the switching setting value setting section 310 stores into the switching setting value storing section 320 the switching setting value received through the user's operation. That is, the switching setting value is allowed to be changed when a value is received through the switching setting value setting section 310.

The modification processing switching section 340 receives, from a control section (not shown), information concerning the presence or absence of bold processing and information concerning the contents of bold processing (the character size, the modification amount, and the direction). The modification processing switching section 340 provides a control signal for stopping unnecessary one of the two functions in accordance with the switching, to the intermediate character pattern processing section 3 and the bitmapped character pattern processing section 5.

In accordance with the character to be outputted, the modification processing switching section 340 switches to each other the output from the intermediate character pattern processing section 3 and the output from the bitmapped character pattern processing section 5. Specifically, the modification processing switching section 340 refers to the contents of bold processing and the switching setting value stored in the switching setting value storing section 320 so as to switch to each other the bold processing using an intermediate character pattern and the bold processing using a bitmapped character pattern.

When bold processing using an intermediate character pattern is selected, it is preferable that the intermediate character pattern processing section 3 side alone is operated while the operation of the bitmapped character pattern processing section 5 side is stopped. In contrast, when bold processing using a bitmapped character pattern is selected, it is preferable that the bitmapped character pattern processing section 5 side alone is operated while the operation of the intermediate character pattern processing section 3 side is stopped. These approaches are employed for reducing the power consumption.

From the aspect of the difference of the character state of the bold processing using a bitmapped character pattern from that of bold processing by other techniques and from the aspect of the processing load (the processing speed), each prior art mechanism employing the bold processing using a bitmapped character pattern has a problem. Thus, development of a new bold processing technique is desired in which further improvement is achieved from the aspects of the difference of the character state and the processing load. The presence of new bold processing techniques expands the width of selection of a bold processing technique in accordance with the usage application. In this sense, the bold processing techniques described in the first and the second exemplary embodiments satisfy the desire.

For example, the character output apparatus 1C according to the third exemplary embodiment is provided with, in addition to the prior art mechanism for performing bold processing using a bitmapped character pattern, a new mechanism for performing bold processing using an intermediate character pattern having been proposed in the first and the second exemplary embodiments. This expands the width of selection of a bold modification processing technique in accordance with the usage application.

Here, from the aspect of the character size, whether bold processing is to be performed in the X-axis direction alone, and the bold modification amount (the modification amount Bx in the X-axis direction and the modification amount By in the Y-axis direction), the modification processing switching section 340 switches the bold processing such that no difference should occur from the bold modification using a bitmapped character pattern and that high speed processing should be achieved regardless of the character size, the modification direction, and the modification amount value.

For example, in the bold processing by the bitmapped character pattern processing section 5, the position of the bitmapped character pattern is moved, and then logical sum operation is performed so that a bold character pattern of the bitmapped character is generated. This technique has a problem that when the character size is large or alternatively the bold modification amount is great, the processing becomes huge and hence requires a long time in generation of the bold character pattern (the bold-processed bitmapped character pattern).

In the mechanism of Patent Document 2, bold modification is performed on a character outline so that the processing is achieved at a high speed. Nevertheless, the problem of occurrence of a difference from the character output using a bitmapped character pattern arises.

On the other hand, in the bold processing by the intermediate character pattern processing section 3, although the intermediate character pattern is used, no difference occurs in the output state of the character from that of the character output using a bitmapped character pattern. Further, the generation technique for the intermediate character pattern is not affected by the character size or the bold modification amount. Thus, the processing does not become huge even when the character size is large or alternatively the bold modification amount is great. On the other hand, the generation processing for the intermediate character pattern and the information amount compression processing for the total number of elements can serve as an overhead. Nevertheless, when the information amount compression processing for the total number of elements is omitted, useless overlap printing can arise.

In the bold processing in the X-axis direction, when the modification amount is small, the frequency of occurrence of element overlap is expectedly low. Thus, processing speed reduction that could be caused when the information amount compression processing is omitted is expectedly avoided. Further, even in a case that the information amount compression processing is employed, the frequency that this processing is actually performed is low. Thus, processing speed reduction is expectedly avoided.

On the other hand, in the case of presence of bold processing in the Y-axis direction (the case of both the X-axis direction and the Y-axis direction and the case of the Y-axis direction alone), even when the modification amount is small, elements are duplicated by the modification amount and then added to other lines. This increases the frequency of overlap occurrence. In general, this reduces the processing speed, although this depends on the relation between the effect of resolution of overlap printing achieved by the information amount compression processing for the total number of elements and the overhead for information amount compression processing.

From the aspects described above, the following conclusions are obtained. In the case of absence of bold processing, it is preferable that the output from the bitmapped character pattern processing section 5 is used. This is because when the output from the intermediate character pattern processing section 3 is used despite the absence of bold processing, the processing speed is reduced owing to the overhead necessary for generating the intermediate character pattern.

In the case of presence of bold processing, it is preferable that one permitting as high speed processing as possible is selected in accordance with the character size, the modification direction (in particular whether the processing is in the X-axis direction alone), and the modification amount. This is because the output from the intermediate character pattern processing section 3 and the output from the bitmapped character pattern processing section 5 have no difference from each other in the output state of the character and hence the superiority or inferiority of the performance is determined mainly in terms of the processing load (the processing speed).

For example, when the character size is small regardless of the modification amount, it may be possible that the output from the bitmapped character pattern processing section 5 is used. In contrast, when the modification amount is small regardless of the character size, it may be possible that the output from the bitmapped character pattern processing section 5 is used.

In contrast, when the character size is large and the modification amount is small, it may be possible that the output from the bitmapped character pattern processing section 5 is used. In other words, when the character size is large and the modification amount is large, it may be possible that the output from the intermediate character pattern processing section 3 is used.

Further, regardless of the character size and the modification amount, in the case of bold processing in the X-axis direction alone, it may be possible that the output from the intermediate character pattern processing section 3 is used. Obviously, with combining whether the bold processing is in the X-axis direction alone with the character size and the modification amount, further case dividing may be made. For example, even in a case that the character size is large, when the bold processing is not in the X-axis direction alone, it may be possible that the output from the bitmapped character pattern processing section 5 is used.

Processing Method

First Example

Figure 10A:
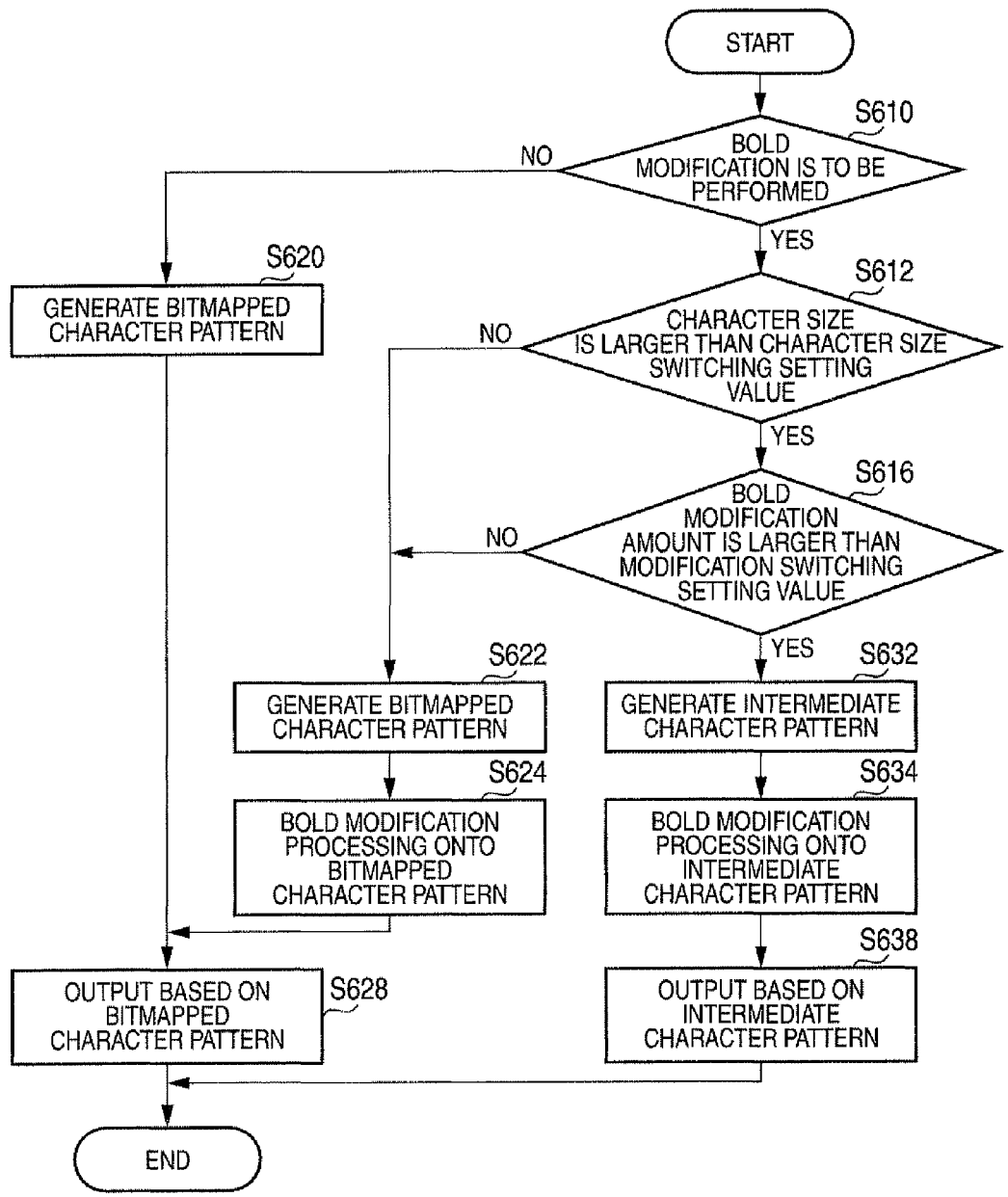
FIG. 10A is a flow chart describing bold processing according to a first example of a third exemplary embodiment.

FIG. 10A is a flow chart describing a first example of bold processing performed in the character output apparatus 10 according to the third exemplary embodiment.

The modification processing switching section 340 determines the presence or absence of bold processing (S610). When bold modification is not specified (S610-NO), the modification processing switching section 340 uses the output from the bitmapped character pattern processing section 5. In this case, the modification processing switching section 340 stops the operation of the intermediate character pattern processing section 3 side, and operates the bitmapped character pattern processing section 5 side alone. In the bitmapped character pattern processing section 5, the bitmapped character pattern generating section 220 generates a bitmapped character pattern (S620). Then, the character output section 240 processes the bitmapped character pattern, and then outputs the character (S628).

When bold modification is specified (S610-YES), the modification processing switching section 340 further compares the contents of modification with the switching setting value stored in the switching setting value storing section 320, and then switches to each other the bold processing using an intermediate character pattern and the bold processing using a bitmapped character pattern.

For example, the modification processing switching section 340 compares the contents of modification with the character size switching setting value stored in the switching setting value storing section 320 (S612). Then, when the character size is smaller than or equal to the character size switching setting value (S612-NO), the modification processing switching section 340 uses the output from the bitmapped character pattern processing section 5. In this case, the modification processing switching section 340 stops the operation of the intermediate character pattern processing section 3 side, and operates the bitmapped character pattern processing section 5 side alone.

In the bitmapped character pattern processing section 5, the bitmapped character pattern generating section 220 generates a bitmapped character pattern (S622). Then, the bitmapped character pattern modification section 230 performs bold processing on the bitmapped character pattern (S624). Further, the character output section 240 processes the bold-processed bitmapped character pattern, and then outputs the character (S628).

When the character size exceeds the character size switching setting value (S612-YES), the modification processing switching section 340 further compares the bold modification amount with the modification switching setting value stored in the switching setting value storing section 320 (S616), and then switches to each other the bold processing using an intermediate character pattern and the bold processing using a bitmapped character pattern.

For example, when the bold modification amount is smaller than or equal to the bold modification switching setting value (S616-NO), the modification processing switching section 340 uses the output from the bitmapped character pattern processing section 5. In this case, the modification processing switching section 340 stops the operation of the intermediate character pattern processing section 3 side, and operates the bitmapped character pattern processing section 5 side alone.

In the bitmapped character pattern processing section 5, the bitmapped character pattern generating section 220 generates a bitmapped character pattern (S622). Then, the bitmapped character pattern modification section 230 performs bold processing on the bitmapped character pattern (S624). Further, the character output section 240 processes the bold-processed bitmapped character pattern, and then outputs the character (S628).

When the bold modification amount exceeds the bold modification switching setting value (S616-YES), the modification processing switching section 340 uses the output from the intermediate character pattern processing section 3. In this case, the modification processing switching section 340 stops the operation of the bitmapped character pattern processing section 5 side, and operates the intermediate character pattern processing section 3 side alone. In the intermediate character pattern processing section 3, the intermediate character pattern generating section 120 generates an intermediate character pattern (S632). Then, the intermediate character pattern modification section 130 performs bold processing on the intermediate character pattern (S634). Then, the character output section 140 processes the bold-processed intermediate character pattern, and then outputs the character (S638).

In the illustrated example, priority is imparted to the case dividing concerning the character size. That is, when the character size is smaller than or equal to the character size switching setting value regardless of the modification amount, the output from the bitmapped character pattern processing section 5 is used. Although not illustrated, the processing at step S612 and the processing step S616 may be interchanged, and hence priority may be imparted to the case dividing concerning the modification amount. Then, when the modification amount is smaller than or equal to the bold modification switching setting value regardless of the character size, the output from the bitmapped character pattern processing section 5 may be used.

Although not illustrated, the processing at step S612 may be omitted, and hence case dividing may be performed with respect to the character size alone. In this case, it is preferable that when bold modification is to be performed on a character having a character size larger than a predetermined size, the intermediate character pattern processing section 3 is operated and that when bold modification is to be performed on a character having a character size smaller than the predetermined size, the bitmapped character pattern processing section 5 is operated.

Although not illustrated, the processing at step S616 may be omitted, and hence case dividing may be performed with respect to the modification amount alone. In this case, it is preferable that when the bold modification amount is greater than a predetermined value, the intermediate character pattern processing section 3 is operated and that when the bold modification amount is greater than the predetermined value, the bitmapped character pattern processing section 5 is operated.

Processing Method

Second Example

Figure 10B:
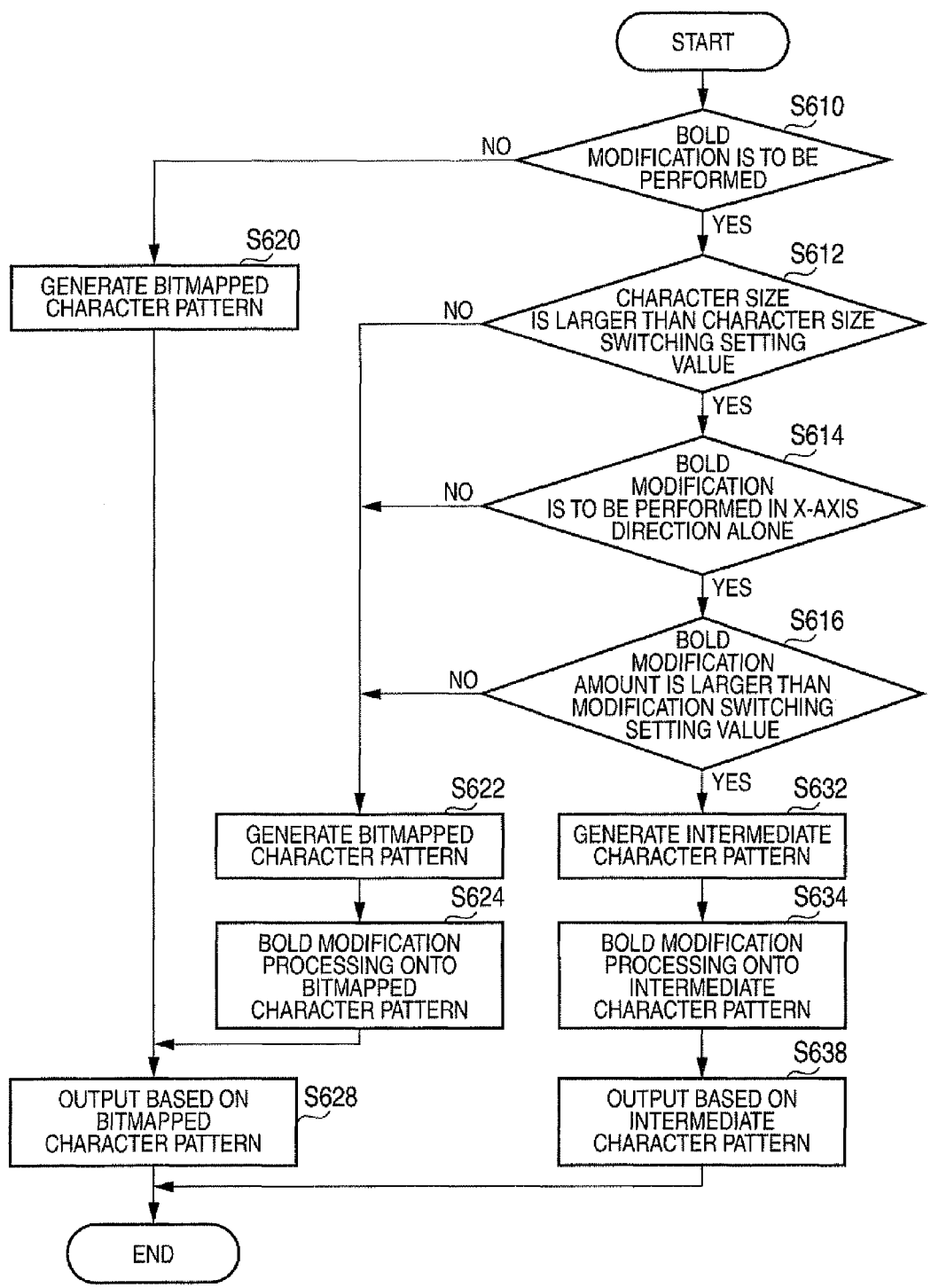
FIG. 10B is a flow chart describing bold processing according to a second example of a third exemplary embodiment.

FIG. 10B is a flow chart describing a second example of bold processing performed in the character output apparatus 1C according to the third exemplary embodiment. The second example is obtained by changing the first example such that the direction of bold modification is also adopted as a determination index for switching of the processing.

In the illustrated example, a determination step (S614) concerning the direction of bold modification is added between the determination step (S612) concerning the character size and the determination step (S616) concerning the modification amount.

When the character size exceeds the character size switching setting value (S612-YES), the modification processing switching section 340 further determines whether the direction of bold modification is the X-axis direction alone (S614), and then switches to each other the bold processing using an intermediate character pattern and the bold processing using a bitmapped character pattern.

For example, when bold modification is to be performed in the Y-axis direction (S614-NO), the modification processing switching section 340 uses the output from the bitmapped character pattern processing section 5. In this case, the modification processing switching section 340 stops the operation of the intermediate character pattern processing section 3 side, and operates the bitmapped character pattern processing section 5 side alone.

In the bitmapped character pattern processing section 5, the bitmapped character pattern generating section 220 generates a bitmapped character pattern (S622). Then, the bitmapped character pattern modification section 230 performs bold processing on the bitmapped character pattern (S624). Further, the character output section 240 processes the bold-processed bitmapped character pattern, and then outputs the character (S628).

When bold modification is to be performed in the X-axis direction alone (S614-YES), the modification processing switching section 340 further compares the bold modification amount with the bold modification switching setting value stored in the switching setting value storing section 320 (S616), and then switches to each other the bold processing using an intermediate character pattern and the bold processing using a bitmapped character pattern.

Although not illustrated, as a modification, the determination step concerning the direction of bold modification may be inserted before the determination step (S612) concerning the character size or after the determination step (S616) concerning the modification amount.

Although not illustrated, another approach is also possible that the processing at step S612 and the processing at step S616 are interchanged and then a determination step concerning the direction of bold modification is inserted between them. Although not illustrated, another approach is also possible that the processing at step S612 is omitted and then a determination step concerning the direction of bold modification is inserted before or after step S616. Although not illustrated, another approach is also possible that the processing at step S616 is omitted and then a determination step concerning the direction of bold modification is inserted before or after step S612.

Although not illustrated, another approach is also possible that the processing at step S616 and the processing at step S616 are omitted and that the determination step concerning the direction of bold modification is employed alone. In each case, in the determination step concerning the direction of bold modification, it is preferable that when bold modification is to be performed in the X-axis direction alone, the intermediate character pattern processing section 3 side is selected, and that when bold modification in the Y-axis direction is included, the bitmapped character pattern processing section 5 side is selected.

Configuration Employing Computer

Figure 11:
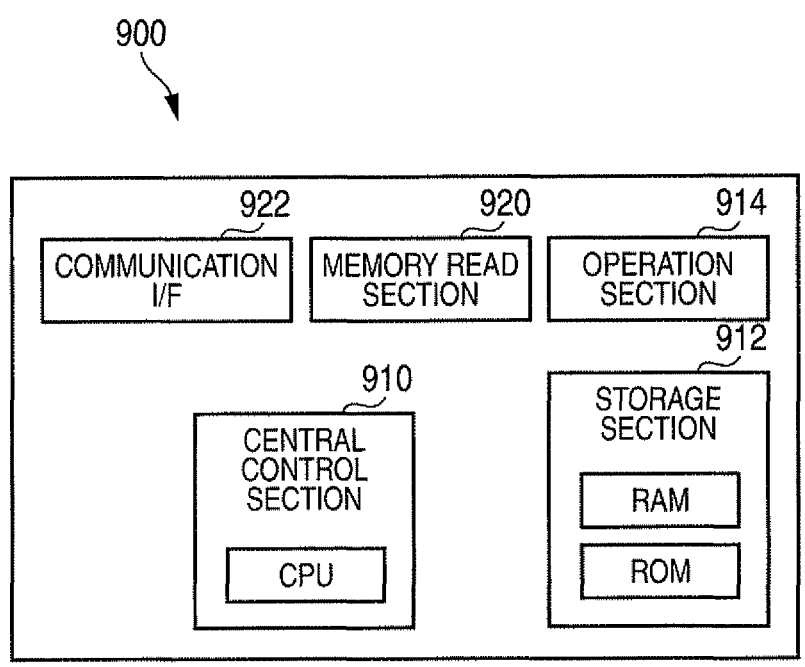
FIG. 11 is a block diagram showing an exemplary configuration in a case that a character output apparatus is constructed from a computer.

FIG. 11 is a block diagram showing another exemplary configuration of the control configuration of a character output apparatus 1. Here, a more practical hardware configuration for the control configuration of the character output apparatus 1 is shown that is constructed from a microprocessor or the like for executing software, which is implemented by employing a computer such as a personal computer.

That is, in the present exemplary embodiment, the mechanism of the control configuration of the character output apparatus 1 of performing control processing concerning the bold processing (character thickening processing) for a character may be constructed from a hardware processing circuit, as well as may be implemented by software by using a computer based on a program code for realizing the function. Thus, a program preferable for realizing the mechanism according to the present exemplary embodiment by software by using a computer or a computer-readable storage medium for storing this program is extracted as an invention. When the mechanism executed by software is employed, processing procedure and the like can easily be changed without the necessity of a hardware change.

A series of the above-mentioned bold processing can be implemented by hardware alone or software alone, as well as by a combined configuration of these. When processing by software is to be executed, a program that sets forth the processing procedure may be built (installed) in a within-the-computer storage medium built in the hardware, and then may be executed. Alternatively, a program may be built in a general-purpose computer capable of executing various kinds of processing, and then may be executed.

The program for causing a computer to execute the bold processing function is distributed through a recording medium such as a CD-ROM. Alternatively, this program may be stored in an FD instead of a CD-ROM. Further, an MO drive may be provided, and then the program may be stored in the MO. Furthermore, the program may be stored in other recording medium such as a nonvolatile semiconductor memory card like a flash memory. Further, the program constituting the software may be provided through a recording medium, as well as may be provided through a cable or wireless communication network. For example, the program may be acquired or updated by means of downloading from other server or the like through a network such as the Internet. Further, at the time that a program is provided in the form of a file that describes a program code for realizing the function of performing the bold processing, the method of providing is not limited to the form of the entire program file. That is, the program may be provided in the form of individual program modules in accordance with the hardware configuration of the system constructed from a computer.

For example, a computer system 900 has: a central control section 910 composed of a CPU (Central Processing Unit) or a microprocessor; a storage section 912 composed of a ROM (Read Only Memory) serving as a read-only storage section or alternatively a RAM (Random Access Memory) serving as a random access memory; an operation section 914; and peripheral members (not shown).

The central control section 910 is equivalent to the core member of a computer represented by a CPU in which the functions of arithmetic operation and control to be performed by a computer are collected in a micro integrated circuit. The control program for bold processing function and the like is stored in the ROM. A storage section in the character outline information storing section 110 or the switching setting value storing section 320 may have that function. The operation section 914 is a user interface for receiving operation from a user.

Here, in the control system of the computer system 900, an external recording medium (not shown) such as a memory card may be provided in an insertable and detachable manner. Further, the function of permitting connection with a communication network such as the Internet may be provided. Thus, the control system may be provided with: a memory read section 920 for reading information on a portable recording medium; and a communication I/F 922 serving as communication interface means to the outside, in addition to the central control section 910 and the storage section 912. Since the memory read section 920 is provided, installation and update of the program from an external recording medium can be supported. Since the communication I/F 922 is provided, installation and update of the program through a communication network can be supported. The basic mechanism of bold processing is similar to that of the exemplary embodiments given above.

Here, description has been given for an exemplary configuration that the control configuration of the character output apparatus 1 is realized by software by using a computer. The particular means of each section (including each functional block) of the control configuration of the character output apparatus 1 for realizing the bold processing of the present exemplary embodiment may be implemented by hardware, software, communication means, a combination of these, or other means. This fact is obvious to the person skilled in the art. Further, functional blocks may be combined into one functional block. Further, the software for causing a computer to execute the program processing is installed in a distributed manner depending on the mode of combination.

The present invention has been described above with reference to the exemplary embodiments. The technical scope of the present invention is not limited to the scope described in the exemplary embodiments. Without departing from the spirit of the invention, various changes and improvements may be added to the exemplary embodiments. Then, the modes obtained by adding such changes and improvements are also included in the technical scope of the present invention.

Further, the exemplary embodiments given above do not limit the invention described in the claims. Further, the combination of all features described in the exemplary embodiments is not necessarily indispensable to the solving means of the invention. The exemplary embodiments given above contain inventions at various stages. Thus, various inventions can be extracted from appropriate combinations of a plurality of disclosed constituent features. Even when several constituent features are omitted from the entire constituent features described in the exemplary embodiments, this configuration obtained by omitting several constituent features can be extracted as an invention as long as the effect is obtained.

For example, in the exemplary embodiments, when the X-axis direction and the Y-axis direction are defined as shown in FIG. 2, bold processing in the X-axis direction has been performed first, and then bold processing in the Y-axis direction has been performed. However, an arbitrary one of these processing procedures may be performed first.

In the exemplary embodiments, as an example of modification processing of changing the thickness of a character, a case has been described that an intermediate character pattern is used in the bold processing of thickening a character. However, this example is merely illustrative. The application of the modification processing of changing the thickness of a character using an intermediate character pattern is not limited to the bold processing but may be the processing of thinning a character. In this case, the processing in the Y-axis direction is achieved by deleting an intermediate character pattern in the processing target row.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A character output apparatus comprising: an intermediate character information generating section that generates intermediate character information indicating a single certain character,
    wherein the intermediate character information is formed by a number of element information pieces,
    and each element information piece has a start point and an end point in an X-axis direction in a two-dimensional coordinate system for characters;

an intermediate character information modification section that performs modification processing for changing a thickness of the certain character onto each element information piece of the generated intermediate character information, by changing the start point and the end point of each element information piece in accordance with a modification amount;

and a first character output section that outputs the certain character based on the changed start point and the changed end point of each element information piece, wherein the intermediate character information modification section performs the modification processing of thickening the certain character, the intermediate character information modification section has an information amount compression section, the information amount compression section determines whether first and second ones of the element information pieces obtained after thickening the certain character are successive to each other, the start point and the end point of each element information piece is changed independent of any change in the start point and the end point of other element information pieces, each element information piece has position information in a Y-axis direction in the two-dimensional coordinate system for characters, and the intermediate character information modification section duplicates or deletes in the Y-axis direction each element information piece in accordance with the modification amount, to change the thickness of the certain character in the Y-axis;

wherein the intermediate character information modification section includes an information amount compression section, the information amount compression section determines as to whether first and second ones of the element information pieces obtained after thickening the certain character overlap with each other, the information amount compression section in case of the determination indicating the first one and the second one overlap, merges the first one and the second one into one element information piece so as to decrease the number of element information pieces, the information amount compression section identifies a start point and an end point of the merged element information piece, and as for the first and the second ones, the first character output section outputs the certain character based on the merged element information piece.

2. The character output apparatus according to claim 1, wherein the intermediate character information modification section changes in the X-axis direction, the start point and the end point of each element information piece in accordance with the modification amount, to change the thickness of the certain character in the X-axis.

3. The character output apparatus according to claim 1, wherein the information amount compression section, in case of determination indicating the first one and the second one are successive, merges the first one and the second one into one element information piece so as to decrease the number of element information pieces, the information amount compression section identifies a start point and an end point of the merged element information piece, and as for the first one and the second one, the first character output section outputs the certain character based on the merged element information piece.

4. The character output apparatus according to claim 1, further comprising:

another character information modification section that performs another modification processing for changing the thickness of the certain character at least in the X-axis direction and in the Y-axis direction onto character information which indicates a set of points in a two-dimensional coordinate system;

a second character output section that outputs the character based on the character information in which the thickness of the certain character is changed;

and a switching section that switches whether the intermediate character information modification section or said another character information modification section is operated, in accordance with contents of processing for changing the thickness of the certain character.

5. The character output apparatus according to claim 4, wherein when the modification processing is for thickening a character having a character size larger than a predetermined size, the switching section causes said another character information modification section to be operated.

6. The character output apparatus according to claim 4, wherein when the amount of modification of thickening the certain character is greater than a predetermined value, the switching section causes the intermediate character information modification section to be operated.

7. The character output apparatus according to claim 4, wherein when the modification processing of thickening the certain character is for a character having a character size larger than a predetermined size and when the amount of modification of thickening the certain character is greater than a predetermined value, the switching section causes the intermediate character information modification section to be operated.

8. The character output apparatus according to claim 4, wherein the modification processing of changing the thickness of the certain character does not include modification processing in the Y-axis direction, the switching section causes the intermediate character information modification section to be operated.

9. A character output method executed by one or more processors comprising:

generating intermediate character information indicating a single certain character, wherein the intermediate character information is formed by element information pieces, and each element information piece has a start point and an end point in an X-axis direction in a two-dimensional coordinate system of the certain character;

performing modification processing for changing a thickness of the certain character onto each element information piece of the generated intermediate character information, by changing the start point and the end point of each element information piece in accordance with a modification amount;

outputting the certain character based on the changed start point and the changed end point of each element information piece;

and performing the modification processing of thickening the certain character using an intermediate character information modification section, wherein the intermediate character information modification section has an information amount compression section, the information amount compression section determines whether first and second ones of the element information pieces obtained after thickening the certain character are successive to each other, and the start point and the end point of each element information piece is changed independent of any change in the start point and the end point of other element information pieces, each element information piece has position information in a Y-axis direction in the two-dimensional coordinate system for characters, and the intermediate character information modification section duplicates or deletes in the Y-axis direction each element information piece in accordance with the modification amount, to change the thickness of the certain character in the Y-axis;

wherein the intermediate character information modification section includes an information amount compression section, the information amount compression section determines as to whether first and second ones of the element information pieces obtained after thickening the certain character overlap with each other, the information amount compression section in case of the determination indicating the first one and the second one overlap, merges the first one and the second one into one element information piece so as to decrease the number of element information pieces, the information amount compression section identifies a start point and an end point of the merged element information piece, and as for the first and the second ones, the first character output section outputs the certain character based on the merged element information piece.

10. A non-transitory computer readable medium storing a program causing a computer to execute a process for outputting characters, the process comprising:

generating intermediate character information indicating a single certain character, wherein the intermediate character information is formed by element information pieces, and each element information piece has a start point and an end point in an X-axis direction in a two-dimensional coordinate system of the certain character;

performing modification processing for changing a thickness of the certain character onto each element information piece of the generated intermediate character information, by changing the start point and the end point of each element information piece in accordance with a modification amount;

outputting the certain character based on the changed start point and the changed end point of each element information piece;

and performing the modification processing of thickening the certain character using an intermediate character information modification section, wherein the intermediate character information modification section has an information amount compression section, the information amount compression section determines whether first and second ones of the element information pieces obtained after thickening the certain character are successive to each other, and the start point and the end point of each element information piece is changed independent of any change in the start point and the end point of other element information pieces, each element information piece has position information in a Y-axis direction in the two-dimensional coordinate system for characters, and the intermediate character information modification section duplicates or deletes in the Y-axis direction each element information piece in accordance with the modification amount, to change the thickness of the certain character in the Y-axis;

wherein the intermediate character information modification section includes an information amount compression section, the information amount compression section determines as to whether first and second ones of the element information pieces obtained after thickening the certain character overlap with each other, the information amount compression section in case of the determination indicating the first one and the second one overlap, merges the first one and the second one into one element information piece so as to decrease the number of element information pieces, the information amount compression section identifies a start point and an end point of the merged element information piece, and as for the first and the second ones, the first character output section outputs the certain character based on the merged element information piece.

* * * * *